United States Patent
Ling

(10) Patent No.: US 7,328,189 B2
(45) Date of Patent: *Feb. 5, 2008

(54) METHOD AND APPARATUS FOR CONDUCTING ELECTRONIC COMMERCE TRANSACTIONS USING ELECTRONIC TOKENS

(75) Inventor: Marvin T Ling, Scottsdale, AZ (US)

(73) Assignee: Paybyclick Corporation, Phoenix, AZ (US)

(*) Notice: Subject to any disclaimer, the term of this patent is extended or adjusted under 35 U.S.C. 154(b) by 1196 days.

This patent is subject to a terminal disclaimer.

(21) Appl. No.: 09/753,784

(22) Filed: Jan. 2, 2001

(65) Prior Publication Data

US 2002/0002538 A1    Jan. 3, 2002

Related U.S. Application Data

(63) Continuation-in-part of application No. 09/665,237, filed on Sep. 18, 2000, which is a continuation-in-part of application No. 09/553,695, filed on Apr. 21, 2000.

(60) Provisional application No. 60/178,239, filed on Jan. 26, 2000.

(51) Int. Cl.
  *G06Q 40/00*    (2006.01)
(52) U.S. Cl. .......................................... 705/41; 705/65
(58) Field of Classification Search ............ 705/35–44, 705/65
See application file for complete search history.

(56) References Cited

U.S. PATENT DOCUMENTS

| | | | |
|---|---|---|---|
| 4,802,218 A | 1/1989 | Wright et al. .................. | 380/23 |
| 4,816,824 A | 3/1989 | Katz et al. | |
| 4,977,595 A | 12/1990 | Ohta et al. ..................... | 380/24 |
| 5,010,485 A | 4/1991 | Bigari ......................... | 364/408 |
| 5,224,162 A | 6/1993 | Okamoto et al. ............. | 380/24 |

(Continued)

FOREIGN PATENT DOCUMENTS

| WO | WO9927475 | 6/1999 |
|---|---|---|
| WO | WO9944165 | 9/1999 |
| WO | WO 01/42946 A2 | 6/2001 |

OTHER PUBLICATIONS

Wayner P, "Digital Cash," Digital Cash: Commerce on the Net, Apr. 1, 1997, pp. 241-245, XP002921211.

(Continued)

*Primary Examiner*—Frantzy Poinvil
(74) *Attorney, Agent, or Firm*—Michael J. DeHaemer, Jr.; Luce, Forward, Hamilton & Scripps LLP

(57) ABSTRACT

Methods and apparatus for conducting electronic commerce using electronic tokens are described. The electronic tokens are issued and maintained by a vendor, who also provides products and services that can be purchased or rented using the electronic tokens. The electronic tokens may be purchased from the vendor either on-line, using a credit card, or off-line, using a check, money order, purchase order, or other payment means. Because the vendor is the issuer of the electronic tokens, there is no need for transactions to be handled by a third party, such as a bank or other organization. This reduces the overhead involved in conducting electronic commerce, and provides the vendor with a greater amount of control. Additionally, the vendor maintains total control over the price of the electronic tokens at any time. For vendors who offer software products for sale or rental, use of electronic tokens makes a variety of rental arrangements practical. Additionally, a user registers and purchases electronic tokens at the vendor. The user may purchase products at any other vendors who conduct electronic commerce using electronic tokens.

13 Claims, 24 Drawing Sheets

U.S. PATENT DOCUMENTS

| | | | |
|---|---|---|---|
| 5,305,383 | A | 4/1994 | Guillou et al. ................. 380/24 |
| 5,539,825 | A | 7/1996 | Akiyama et al. ............. 380/24 |
| 5,655,023 | A | 8/1997 | Cordery et al. ............... 380/51 |
| 5,671,364 | A | 9/1997 | Turk ........................... 395/239 |
| 5,815,657 | A * | 9/1998 | Williams et al. ............ 713/200 |
| 5,832,089 | A | 11/1998 | Kravitz ........................ 380/24 |
| 5,839,119 | A | 11/1998 | Krsul et al. |
| 5,850,442 | A | 12/1998 | Muftic |
| 5,872,844 | A | 2/1999 | Yacobi |
| 5,878,138 | A | 3/1999 | Yacobi |
| 5,889,860 | A | 3/1999 | Eller et al. |
| 5,899,980 | A | 5/1999 | Wilf et al. |
| 5,900,564 | A | 5/1999 | Kurakake |
| 5,920,861 | A | 7/1999 | Hall et al. |
| 5,930,777 | A | 7/1999 | Barber |
| 5,937,391 | A | 8/1999 | Ikeda et al. |
| 5,943,423 | A | 8/1999 | Muftic |
| 5,943,424 | A | 8/1999 | Berger et al. ................. 380/25 |
| 5,963,924 | A | 10/1999 | Williams et al. |
| 5,982,891 | A | 11/1999 | Ginter et al. |
| 5,983,207 | A | 11/1999 | Turk et al. .................... 705/39 |
| 5,999,919 | A | 12/1999 | Jarecki et al. |
| 6,018,720 | A | 1/2000 | Fujimoto |
| 6,185,541 | B1 * | 2/2001 | Scroggie et al. .............. 705/14 |
| 6,236,972 | B1 | 5/2001 | Shkedy |
| 6,385,596 | B1 | 5/2002 | Wiser et al. |
| 6,473,500 | B1 * | 10/2002 | Risafi et al. ........... 379/144.01 |
| 6,473,740 | B2 | 10/2002 | Cockrill et al. |
| 7,197,641 | B2 | 3/2007 | Stangel |
| 2002/0108050 | A1 | 8/2002 | Raley et al. |

OTHER PUBLICATIONS

O'Mahony D et al., "Electronic Payment Systems," 1997, Electronic Payment Systems, Artech House Computer Science Library, Boston, MA: Artech House, US, XP002122620 ISBN: 0-89006-295-5, pp. 146-147.

O'Mahony D et al., "Electronic Payment Systems," 1997, Artech House Inc., XP002907281, pp. 191-212.

O'Mahony et al., "Electronic Payment Systems," 1997, pp. 191-212.

"Payment mechanisms designed for the Internet," printed from the Internet at http://ganges.cs.tcd.ie/mepeirce/Project/ oninternet.html, on Oct. 23, 2000.

"FC '97 Papers," Rafael Hirschfeld (Ed.), Feb. 1997, printed from the Internet at http://www.arraydev.com/commerce/jibc/9704-30. htm, on Oct. 20, 2000.

"Networked payment mechanisms & digital cash," printed from the Internet at http://inf2.pira.co.uk/top033.htm, on Oct. 20, 2000.

"Small change: Micropayment," printed from the Internet at http://www2.computerworld.com/home/features.nsf/All/ 980223micropaylinks, on Oct. 23, 2000.

"A plan for the Introduction of Internet Cash," printed from the Internet at http://www.jim.com/jamesd/kong/plan.htm, on Oct. 20, 2000.

http://www.internetdollar.com, printed from the Internet on Oct. 20, 2000.

"Micropayment methods," printed from the Internet at http://www.transaction.net/payment/micro.html, on Oct. 20, 2000.

http://www.ecoin.net, printed from the Internet on Oct. 20, 2000.

"Scaleable, Secure Cash Payment for WWW Resources with the PayMe Protocol Set," printed from the Internet at http://ganges.cs.tcd.ie/mepeirce/Project/Payme/Overview.html on Oct. 23, 2000.

Wayner, Peter, *Digital Cash, 2nd Edition: Commerce on the Net*, Chapter 22 "Magic Money:" pp. 241-248, AP Professional, London (1997).

"A plan for the introduction of internet cash," URL: http://www.jim.com/jamesd/kong/plan.htm, printed Oct. 20, 2000.

"Common markup for Ecash per-fee-links," Ecash.com adapted version of W3C working draft of Aug. 25, 1999, URL: http://www.ecash.com/MicroPayment/micropayment.htm, printed Sep. 28, 2001.

"Common Markup for micropayment per-fee-links," WC3 Final Public Working Draft of Aug. 25, 1999, URL: http://www.w3.org/TR/WD-Micropayment-Markup/, printed Oct. 16, 2001.

"Internet Dollar is the money of the Internet," *Internet Dollar LTD.*, URL: http://www.internetdollar.com, printed Oct. 20, 2000.

"Micropayment Methods," URL: http://www.transaction.net/payment/micro.html, printed Oct. 20, 2000.

"Network payment mechanisms & digital cash," URL: http://inf2.pira.co.uk/top033.htm, last updated Jul. 6, 2000, printed Oct. 20, 2000.

"Small change: Micropayment," *Computerworld* 2000, URL: http://www2.computerworld.com/home/features.nsf/All/ 980223micropaylinks, printed Oct. 23, 2000.

"The MilliCent Protocol for Inexpensive Electronic Commerce," In *Published Proc. First USENIX Workshop on Electronic Commerce*, Jul. 1995, URL: http://www.millicent.digital.com/works/details/papers/millicent-w3c4/millicent.html, printed Oct. 25, 2001.

"The MilliCent Protocols for Electronic Commerce," In *Published Proc. First USENIX Workshop on Electronic Commerce*, Jul. 1995, URL: http://www.millicent.digital.com/works/details/papers/mcentny.htm, printed Oct. 25, 2001.

"Transmedia Europe, Inc. and . . . announce the acquisition on Silicon Valley Internet . . . ," *PR Newswire*, Jul. 16, 1998.

"Wave Systems and IBM to Collaborate on Technology for Accessing Digital Content," *Bus. Wire*, Dec. 18, 1997.

"What is eCoin micropayment system?" *eCoin Incorporated*, URL: http://www.ecoin.net, printed Oct. 20, 2000.

Bellare, M. et al., "Variety Cash: a Multi-purpose Electronic Payment System," Proc. Third Usenix Workshop on Electronic Commerce, Extended Abstract, Jun. 1998.

Cohen, Warren, "Online malls move closer to home," *U.S. News & World Report*, vol. 123, No. 21, p. 86, Dec. 1, 1997.

Kosiur, Dave, "Buying Data bit by bit with Microcash: new technology lets Internet users pay as they go," *PC Week*, vol. 13, No. 34, Aug. 26, 1996.

Manasse, Mark, "The MilliCent Microcommerce System," DIGITAL Systems Research Center Technical Presentation, Jul. 1997, URL: http://www.millicednt.digital.com/works/details/presentations.html.

Medvinsky, Gennady, "NetCash: A design for practical electronic currency on the Internet," In *Proceedings of the First ACM Conference on Computer and Communications Security*, Nov. 1993.

Michael Peirce and Donal O'Mahony, "Scaleable, Secure Cash Payment for WWW Resources with the PayMe Protocol Set," URL: http://ganges.cs.tcd.ie/mepeirce/Project/Payme/Overview.html, printed Oct. 23, 2000.

Michael Peirce, "Payment mechanisms designed for the Internet," URL: http://ganges.cs.tcd.ie/mepeirce/Project/oninternet.html, printed Oct. 23, 2000.

Neuman, B. et al., "Requirements for Network Payment: The NetCheque™ Perspective," In *Proceedings of IEEE Compcon '95*, San Francisco, U.S.A., Mar. 1995.

Nielsen, J., "The Case for Micropayments," useit.com (Alertbox Jan. 1998), URL: http://www.useit.com/alertbox/980125.html, printed Oct. 23, 2001.

O'Mahony, D. et al., "Electronic Payment Systems," The Artech House Computer Science Library, Jun. 13, 1997.

Rafael Hirschfeld (Ed.), "FC '97 Papers," In *Proceedings First Int'l Conference on Financial Cryptography*, Feb. 1997, URL: http://www.arraydev.com/commerce/jibc/9704-30.htm.

Rodriguez, Karen, "Toolkit Secures Internet Transactions," *InfoWorld*, vol. 17, No. 8, p. 10, Feb. 20, 1995.

Don Tapscott, "The Web Doesn't Have to Shut Out the 'small Stuff," Computerworld, Inc. (Nov. 2000), URL:http://www.computerworld.com/cwi/story/0,1199,NAV47-81 STO54155,00.html, printed Oct. 17, 2001.

Don Tapscott, "Giving a Lift to Micropayments," Computerworld, Inc. (2000), URL: http://www.computerworld.com/cwi/story/0,1199,NAV47-68-86-1721_STO55261,00.html, printed Oct. 17, 2001.

Jean-Marc Huijskens, "Cartio Micropayments Whitepaper," Net. Actuals B.V., May, 2001.

"Clickshare: Connecting Customers with Contect," Clickshare Service Corp. URL: http://www.clickshare.com/aboutus/, printed Oct. 17, 2001.

"The Magex Solution FAQs," Magex Limited (2000), URL: http://www.magex.com/magexsolution/overview/faqs.asp, printed Oct. 17, 2001.

"How It Works," Magex limited (2000), URL: http://www.magex.com/getmagex/howitworks/, printed Oct. 17, 2001.

Eric J. Lerner, "Security Makes 'Net Gains'" IBM Think Research, URL: http://domino.research.ibm.com/comm/wwwr_thinkresearch.nfs/pages/security196.html printed on Oct. 17, 2001.

Michele Pepe, "Start-Up Expands Payments Options", CRN (Aug. 2000) URL: http://www.enition.com/press/content_3.html, printed Oct. 17, 2001.

"QPASS Commerce Solutions for Wireless Carriers", Qpass, Inc.; URL: http://www.qpass.com/default.asp?pid=wirelesscarriersolutions; http://www.qpass.com/default.asp?pid=products; http://www.qpass.com/default.asp?pid=customerspartners, printed on Oct. 17, 2001.

Renee Boucher Ferguson, "Pay-as-you-go Transactions", eWEEK (Nov. 2000); URL: http://techupdate/zdnet.com/techupdate/stories/main/0,14179,2657472,00.00.html printed on Oct. 17, 2001.

Doug Bedell, "Pay-per-click Micropayments May Become the Norm on the Net," The Dallas Morning News (Nov. 19, 2000) URL: http://www.dallasnews.com/technology/218421. micropayments.html, printed Nov. 1, 2001.

"RocketCash — HowItWorks — FAQs" RocketCash, LLC, URL: http://www.rocketcash.com/howitworks/index.php?page=frequently_asked_questions, printed Mar. 1, 2002.

* cited by examiner

| | | | [HOME][BACK][FORWARD][LAST] |
|---|---|---|---|
| 601 Summary List and Description of selected software categories, each with availability in purchase or rent | | | |
| Document Raster Editing | For Purchase | For Rent/ Time | For Rent/# of times of use | For Rent/ # of Processings |
| Software A | [X] | [ ] | [ ] | [ ] |
| Software B | [X] | [X] | [ ] | [ ] |
| Software C | [X] | [ ] | [X] | [ ] |
| Software D | [ ] | [ ] | [ ] | [X] |
| [QUIT] | | | [BACK][PROCEED] |

FIG. 7

700 — [HOME][BACK][FORWARD][LAST]

User selected software summary description & cost        Detailed Information:

| Product | Type of Purchase | # of Tokens | |
|---|---|---|---|
| [X] Software A | Purchase | 100 | Yes |
| [X] Software D | For Rent | | Yes |

701 {

702 {
    # Processings    # of Tokens
  [ ]  Up to 100    10
  [X]  101 - 1,000    80
  [ ]  1,001-10,000    600    704

Do you have Software D installed on your computer? [X] Yes [ ] No

Total # of tokens required RT: <u>180</u>. User AT: <u>500</u>. Remaining AT if purchased: <u>320</u>
                  705        706                            707

[QUIT]                      [BACK][ORDER]
710                          709  708

FIG. 8

| | |
|---|---|
| 800 | [HOME][BACK][FORWARD][LAST] |

Customer order confirmation
You have ordered the following software products:

| Product | Type of Purchase | Tokens Required |
|---|---|---|
| Software A | Purchase | 100 |
| Software D | For rental use to process 1,000 times | 80 |
| | Total # tokens required for this purchase | 180 |

You already have Software D installed on your computer.
1. We will download Software A with permanent authorization code.
2. We will download a new authorization code for the addition of 1,000 processings for Software D.

| Total tokens required RT | User AT | New AT |
|---|---|---|
| [180] | [500] | [320] |
| 801 | 802 | 803 |

| [QUIT] | [BACK] | Click here if OK: [ORDER CONFIRMED] |
|---|---|---|
| 806 | 805 | 804 |

FIG. 9

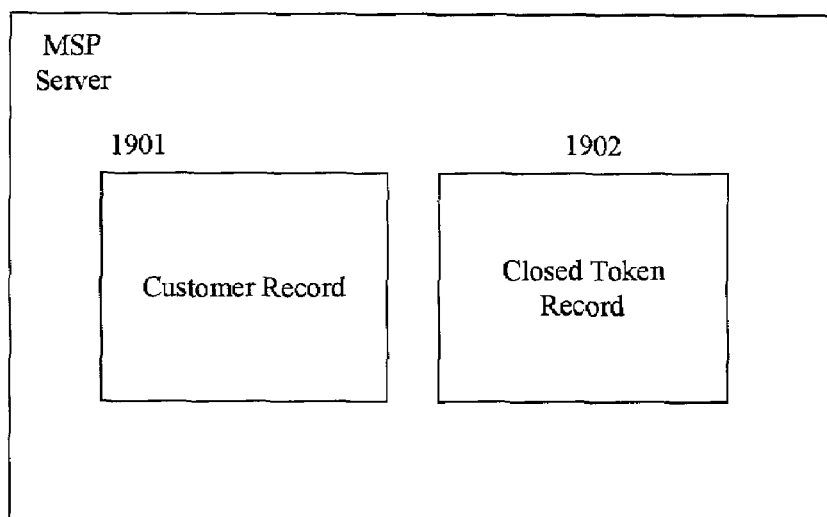
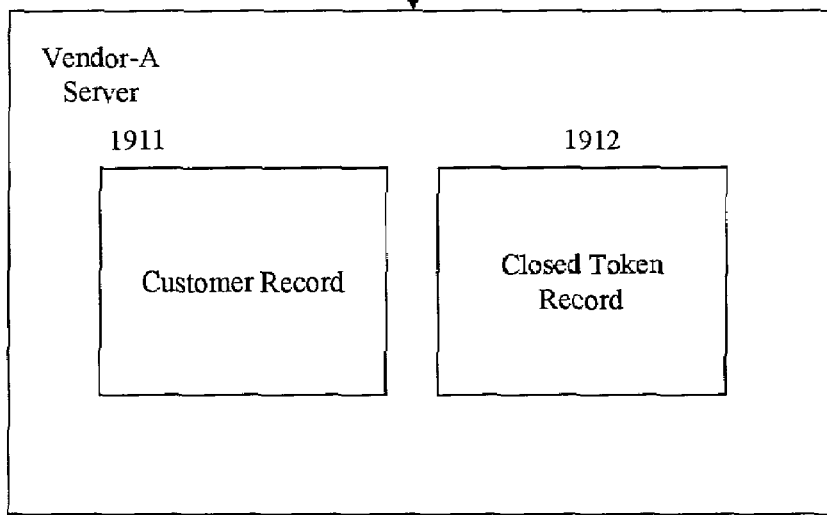
FIG. 14

Basic Token Price: 10 cents

| Product | | # of Tokens | | Cash Price |
|---|---|---|---|---|
| Product A | 700 | 1,000 | 800 | $100.00 |
| Product B | | 58 | | $ 5.80 |
| Product C | | 750 | | $ 75.00 |

Do you want to purchase using tokens or credit card? [X] Token  [ ] Credit Card 900  901

[HOME][BACK][FORWARD][LAST]

[BACK][ORDER]

[QUIT]

FIG. 17

METHOD AND APPARATUS FOR CONDUCTING ELECTRONIC COMMERCE TRANSACTIONS USING ELECTRONIC TOKENS

RELATED APPLICATIONS

This application is a continuation-in-part of U.S. patent application Ser. No. 09/665,237, filed Sep. 18, 2000, which is a continuation-in-part of U.S. patent application Ser. No. 09/553,695, filed Apr. 21, 2000. This application also claims priority from U.S. provisional application Ser. No. 60/178,239, filed Jan. 26, 2000.

FIELD OF THE INVENTION

The present invention relates to methods and apparatus for conducting electronic commerce using electronic tokens. More particularly, the present invention provides a means to purchase, rent, or extend the rental period on software or other products and services using electronic tokens, which may be purchased either on-line or off-line.

BACKGROUND OF THE INVENTION

Electronic commerce using the World Wide Web (Web) is exploding in growth. Many Web sites have been developed through which Web service providers may advertise and offer a variety of products for sale. As electronic commerce becomes popular, increasing numbers of vendors are offering a variety of products and services on the Web. Among these vendors are software vendors, known as application service providers (ASPs), who provide software for sale or rental over the Web.

Software products being offered by an ASP are typically displayed at the purchaser's client computer. The display may include a description of each software program and a price for the software. As the purchaser sends a request to purchase software programs to the ASP server, the server must interact with the client system to confirm the purchases and the payment method. When the ASP server accepts the purchase order and the payment method, the ASP server downloads the software product electronically to the purchaser's client computer. To prevent unauthorized use of the software product, each software product is typically protected by encryption, usually referred to as a software lock (or key).

Upon successful completion of the purchase transaction, the ASP downloads a decrypted version of the software or an authorization code which will "unlock" the software for the purchaser if the software being purchased is already installed on the purchaser's client computer. The latter situation may exist if the rental period of the software product has expired and the purchaser wishes to extend its use.

Since some software products are relatively expensive or use of a particular software product may become obsolete after a period or number of uses by a purchaser, the purchaser may want to rent the software product instead of purchasing it outright. Thus, the software may be rented for use for a certain period of time or for a certain number of uses. For example, it may be preferable to rent computer games rather than purchase them, since computer games often lose their interest and appeal after repeated playing. Additionally, a purchaser may wish to rent the use of a software program that is used only occasionally, such as a language translator or document clean-up or editing software. The rental of software thus provides users a relatively inexpensive and economic method to use software.

When a user finds that he is using a piece of rented software repeatedly, it may be desirable to extend the rental period, or to convert rented software to permanent use. An ASP may, therefore, offer users the ability to purchase additional uses of a software product, extend the rental period of a software product, or convert rented software to permanent use. These operations are typically achieved by sending the user new authorization codes or keys that enable the software to continue operation until the new number of uses or time period has expired. By providing only a new authorization code or key, the ASP avoids having to re-download the software to the user's computer.

As the use of an ASP becomes more popular, the interaction between purchaser client computers and ASP servers will become much more frequent. Therefore, it will be desirable for ASPs to provide their purchasers the convenience of minimizing the requirement for interaction between a client computer and the ASP server in order to complete the purchasing or rental transaction, as the case may be. It would also be desirable for ASPs to minimize or limit the frequency of asking the purchaser to transmit the user's private, sensitive information, such as credit card information. Although the purchaser's credit card number is encrypted during the transmission, it will be highly desirable to minimize its exposure through the Web.

Additionally, some software rentals may have a very low cost. For example, renting a single page use of a translation package may cost less than the typical fees associated with processing credit card transactions. Such "micropayment" transactions, sometimes amounting to only fractions of a cent, may also occur in the context of providing access to media, or Web-based services, such as search engines. In each of these cases, it is necessary to provide a way for users to pay for such transactions without incurring the overhead of a credit card charge.

Similar demands are present for vendors of products and services other than software. While there may be many consumers on the Web interested in purchasing or renting a wide variety of products and services, many of these consumers are either unwilling to take the risk of using their credit card over the Internet, or do not possess a credit card that may be used to make purchases on the Web. Additionally, some products and services available over the Web are small enough in cost that they do not justify the overhead of handling credit card transactions.

To address these concerns, various forms of electronic currency have been developed and marketed by numerous companies. For example, eCash Technologies Incorporated, of Bothell, Wash., offers a product called "eCash", which relies on encryption and digital signature technology to permit selected "eCash" banks to issue "eCash" currency to users, which may be spent on the Web sites of vendors who will accept this "ecash". These vendors may then exchange the "eCash" for traditional money through an "eCash" bank. The use of "eCash" permits micropayments, and permits users to purchase products and services on the Web without using a credit card.

The "ecash" system, and other similar systems, eliminate the need to use a credit card for each on-line transaction, and permit micropayments. Such systems require that users and merchants make arrangements with authorized banks, and require both the user and the merchant to convert between real currency and electronic currency through an authorized bank.

Another system is provided by RocketCash Corporation, of Mountain View, Calif. The RocketCash system sets up accounts for teens who do not have credit cards, and permits their parents to add money to the accounts using checks, money orders, or credit cards. A teen may then shop on the Web, and have the purchases billed to his or her RocketCash account. This eliminates the need for credit cards, but does not address micropayments. Additionally, it is still necessary to establish and fund an account with a single central entity (i.e. RocketCash Corporation) before goods may be purchased.

InternetCash Corporation, of New York, N.Y., offers a similar product, called InternetCash™, based on pre-paid card that is purchased in pre-determined denominations from a store, and may be used at selected on-line merchants. The InternetCash™ system can handle transactions smaller than will be processed by most credit cards, and provides a means to anonymously purchase items on the Internet, without using a credit card. Like other previously known electronic currency systems, InternetCash™ requires merchants to obtain payment from a central organization.

Another electronic currency, called "Beenz", is provided by Beenz.com, Inc., of New York, N.Y. The "beenz" system permits registered users to earn "beenz" currency as an incentive for visiting particular Web sites, shopping on-line at particular Web sites, and other on-line activity. The currency "earned" by these activities may be spent at selected Web vendors. This system, while it does not use a credit card, and may be used for micropayments, is not well suited to more general use, as there is no way to purchase the "beenz" currency. Additionally, as in the other examples cited above, vendors must rely on a single organization to receive payment in real money.

Numerous patents on electronic currency have been issued. Among these are U.S. Pat. No. 5,983,207, to Turk et al., and U.S. Pat. No. 5,671,364, to Turk, which discuss electronic currency systems based on gold or some other commodity held at a central location. U.S. Pat. No. 4,977,595, to Ohta et al., describes cryptographic techniques that may be used by a bank to issue electronic cash. Like the other systems described hereinabove, the methods described in these patents use central organizations, such as banks, to manage user accounts and to handle transactions.

Such systems necessarily impose overhead, in that both the vendors who accept these various forms of electronic currency, and the users who buy items in exchange for electronic currency must deal with a central organization, such as a bank. Additionally, since the central organization controls the issuance of the electronic currency, the vendors who accept the electronic currency have no control over the value of the electronic currency, its sale price, the terms on which it may be bought, or to whom the electronic currency is sold. For example, it is not possible using such systems for a vendor of products or services to agree with his customer on payment terms for electronic currency that will be used to purchase goods, since the customer must pay a bank or other third-party organization for the electronic currency.

In view of the above, it would be desirable to provide apparatus and methods that permit a variety of payment options, such as credit card purchases, checks, money orders, or purchase orders to be used to purchase electronic currency or tokens.

It would also be desirable to provide electronic currency or tokens that may be issued and used with minimal overhead, and that do not require on-line communication with a bank or other organization to issue or use the tokens.

It would further be desirable to provide apparatus and methods that give a vendor complete control over the sale and distribution of electronic currency or tokens that may be used to purchase products and services from that vendor.

In order to further provide convenience to users, it would be desirable that a user registered at a vendor web site can also purchase or rent product(s) and/or service(s) provided by other vendors seamlessly without requiring the same user to re-register with other vendors.

SUMMARY OF THE INVENTION

It is an object of the present invention to provide apparatus and methods that permit a variety of payment options, such as credit card purchases, checks, money orders, or purchase orders to be used to purchase electronic currency or tokens.

It is also an object of the present invention to provide electronic currency or tokens that may be issued and used with minimal overhead, and that do not require on-line communication with a bank or other organization to issue or use the tokens.

It is a further object of the present invention to provide apparatus and methods that give a vendor complete control over the sale and distribution of electronic currency or tokens that may be used to purchase products and services from that vendor.

These and other objects of the present invention are achieved by providing apparatus and methods that permit a vendor to directly issue electronic tokens that may be used to purchase products and services from that vendor. A Web site maintained by the vendor is provided with the added ability to sell electronic tokens to users of the Web site in exchange for payment in a variety of forms. Electronic tokens purchased from the vendor are kept in a user account in a database that is maintained by the vendor.

Because the vendor himself is the issuer of the electronic tokens, he may choose to issue the tokens in exchange for any form of payment that he is willing to accept. The methods and apparatus of the present invention support both on-line payment (e.g., using a credit card), and off-line payment (e.g., using a check, money order, or purchase order) for electronic tokens.

The vendor lists the prices of products and services offered on his Web site in terms of electronic tokens. Because the vendor is the issuer of the electronic tokens, in formulating these prices, he may set the value of the tokens to any level that he chooses.

Users purchase or rent products and services from the vendor's Web page using the electronic tokens. After a user chooses a list of products or services that he would like to purchase or rent, the system of the present invention checks to see if the user's account contains a sufficient number of tokens to complete the purchase. If there are enough tokens in the user's account, the tokens used for the purchase or rental are subtracted from the user's account, and the purchase or rental may proceed. Otherwise, the user is given an opportunity to purchase additional tokens to cover the price of the products and services he desires.

If the vendor is an application service provider (ASP) who sells software for download, the methods and apparatus of the present invention permit the software to be purchased, or rented for a variety of terms using electronic tokens. Software may be rented for a particular time period, a number of uses, or a number of processings. Each of these forms of rental may be initiated or extended in exchange for electronic tokens. Extension of a software rental, in which the rented software is already installed on the user's computer, requires only that the user download a new authorization code for the software, rather than downloading the entire software application.

The present invention also provides methods for transferring electronic tokens between users. Additionally, methods are provided for handling purchases on an auction site using electronic tokens issued by the auction site.

It is another object of the present invention to provide an apparatus and methods to permit a customer registered at a first vendor web site to purchase or rent product(s) and/or service(s) from a second vendor's web site using electronic tokens.

It is also an object of the present invention to permit a user registered at a vendor Web Site that sets electronic tokens at one value to purchase products or services offered by another vendor Web Site that sets different values for its electronic tokens.

Further, it is an object of the present invention to provide an apparatus and methods to keep accurate records of electronic tokens transferred and converted from one vendor's Web Site to another vendor's Web Site.

A Mall Service Provider (MSP) may authorize the use of electronic tokens to a plurality of vendors web sites who use the electronic tokens in business transactions with customers. The MSP oversees the use of the tokens by the vendors and keeps business records relating to the authorized tokens in a database. In a closed system, customers may use electronic tokens issued by a vendor for electronic transactions only at that vendor web site. In an open system, a user may use electronic tokens issued from one member vendor web site to purchase items at any member vendor web site. In one example of an open system, the user may exchange token issued from a first vendor for tokens issued by a second vendor.

Another example of an open system includes open tokens. Open tokens are tokens accepted by two or more of an MSP's member vendors. Open tokens of the present invention include Universal Tokens, Manufacturer's Tokens, Gift Certificate Tokens, and Group Tokens, all of which may be used in electronic transactions at participating vendor's web sites. Universal tokens are accepted by all of the MSP's participating vendors. Manufacturer's Tokens are issued to customers and may be used by customers to purchase or rent only goods and services from that manufacturer. Manufacturer's Tokens may be used at a participating vendor's web site to purchase or rent the issuing manufacturer's goods and services.

Gift certificate Tokens are issued by a credit institution or vendor to customers and may be used by the customers to purchase or rent goods and services at participating vendors' web sites. Group Tokens may be issued by a group of participating vendors who form strategic partnerships and provide incentives to users to purchase goods or services offered by the group of vendors. Group tokens may be used for electronic transactions at all participating vendor web sites in the group.

The present invention also includes Auction Tokens. Auction Tokens may be used for electronic transactions at an auction mall site to purchase or rent goods or services that are sold or rented through a process of competitive bidding.

BRIEF DESCRIPTION OF THE DRAWINGS

The above and other objects and advantages of the present invention will be apparent upon consideration of the following detailed description taken in conjunction with the accompanying drawings, in which like characters refer to like parts throughout, and in which:

FIG. 7 is an example screen from an application service provider, showing various types of software rental or purchase that are available;

FIG. 8 is an example screen from an application service provider, showing an order list containing software rentals and purchases that have been selected by a user, to be paid for using electronic tokens;

FIG. 9 is an example screen from an application service provider, verifying the user's order;

FIG. 14 is a brief diagram of databases residing with the MSP server and the vendor server in accordance with the principles of the present invention;

FIG. 17 is a sample web page where prices for items offered for sale are listed in electronic tokens and equivalent cash value;

DETAILED DESCRIPTION OF THE INVENTION

Figure 1:
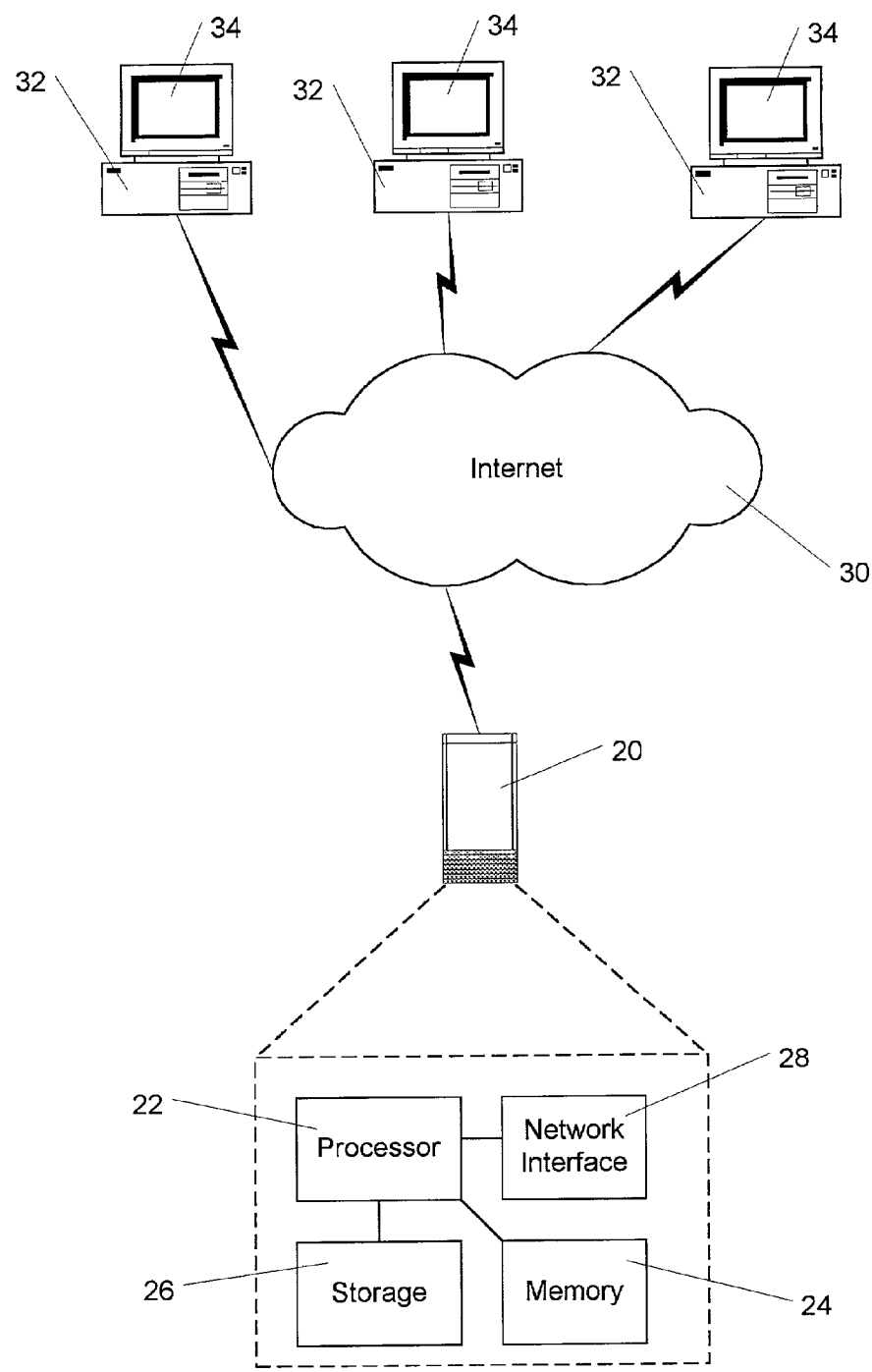
FIG. 1 is an overview of the networked environment in which the methods and apparatus of the present invention are used.

The present invention provides a method and system for conducting business transactions in a networked environment using "electronic tokens" (or "tokens") as a price for each item or product being offered for sale or rental by a vendor. As a user creates his order list, the total number of tokens required (RT) is constantly updated and displayed together with the user's available tokens (AT). To complete the business transaction, the user can simply click on order and order confirmed buttons on the display. The total number of tokens used for purchases are subtracted from the user's available tokens (AT) which is also updated and displayed at the client computer.

Since electronic tokens are used for the business transaction, the need to transmit the user's credit card number and other personal sensitive information between the user's computer and the vendor's computer for each transaction is eliminated. Thus, the method and system of the present invention provides users the convenience of minimizing interactions between the user's computer (the client computer) and the vendor's computer (the server) thus reducing overhead. Furthermore, security for the user's personal sensitive information is improved.

Additionally, since the electronic tokens are issued directly by the vendor of the software or other products and services on which the tokens may be spent, rather than by a bank or other centralized organization, the vendor retains control over issuing and redeeming the tokens. The vendor is able to make whatever arrangements he or she desires for payment for the tokens, including both on-line (e.g. credit card) and off-line (e.g. check, purchase order, billing) transactions. It should be noted that as used herein, a vendor includes any subsidiaries, affiliates, and other corporate entities or persons authorized by the vendor to issue tokens.

The methods and system of the present invention do not require that any payment be made using the user's credit card. Of course, the user has the option of using a credit card to purchase tokens using the on-line method, but may avoid use of a credit card by using the off-line method for purchasing tokens. Because the user need not use a credit card for his purchases, it is unnecessary for the user to have a credit card, or for the user's computer or the vendor's computer to interact over the network with a bank or other financial institution to process credit card transactions. Additionally, since orders can be handled without credit card transactions, the overhead associated with such transactions can be reduced or eliminated, permitting micropayments. Further, since small purchases are paid for in tokens, the vendor need not send out an invoice or incur other overhead involved in handling financial transactions with small purchases.

A further benefit of using the vendor-issued electronic tokens of the present invention is that privacy risks are decreased. Since all purchases or business transactions are done using tokens, very little or no personal sensitive information, such as the user's credit card number, need be transmitted over communication lines, such as the Internet. Although information transmitted via the Internet may be encrypted, it is still desirable to eliminate or minimize such transmissions, since they may be intercepted and decrypted. Furthermore, since the vendor and user interact directly for the purchase and use of electronic tokens, rather than relying on a third party such as a bank, users may be selective about which vendors they are willing to trust with their private information.

It will be apparent to one of ordinary skill in the relevant arts that although the electronic tokens described herein may be of a single denomination, multiple denominations of electronic tokens could be provided. For example, a vendor may offer "silver" tokens, having a unit value, and "gold" tokens, having a value of ten "silver" tokens. The vendor may optionally price the various denominations of electronic tokens however he chooses. For instance, in the example given above, the "silver" tokens may be priced at ten cents each, while the "gold" tokens are priced at ninety-five cents each, giving the user a discount for purchasing "gold" tokens.

Referring now to FIG. 1, the networked environment and apparatus of the present invention are described. Server computer 20 is controlled by a vendor who offers products and services for sale or rental over a network, such as the Internet. Server computer 20 includes processor 22, memory 24, storage 26, and network interface 28. In a preferred embodiment, server computer 20 executes Web server software, through which products and services are offered for sale or rental, and software for issuing and handling electronic tokens, which are used to pay for the products and services. Additionally, server computer 20 may execute database software, which stores information on products and services for sale or rental, and information about users and their accounts for storing electronic tokens. If the vendor is selling or renting software over the network, server computer 20 may execute software that issues authorization codes for use of the software that is being sold or rented.

It will be understood by one skilled in the art that the functions performed by server computer 20 may alternatively be performed by several computers controlled by the vendor. In situations where the vendor is handling a high volume of orders over the network, it may be necessary to distribute the tasks performed by server computer 20 among several computers for performance reasons.

Server computer 20 is connected to network 30 through network interface 28. Network 30, preferably the Internet, is a communication network that connects server computer 20 to one or more client computers 32. Each of client computers 32 is operated by a user who may connect with server computer 20 through network 30 for the purpose of purchasing or renting products and services from the vendor who controls server computer 20. Each of client computers 32 includes a processor (not shown), memory (not shown), and a display 34. Each of client computers 32 preferably executes Web browser software, or other software that permits client computers 32 to communicate with server computer 20. Client computers 32 may also execute software that handles authorization codes for software products that are purchased or rented from the vendor who operates server computer 20.

Figure 2:
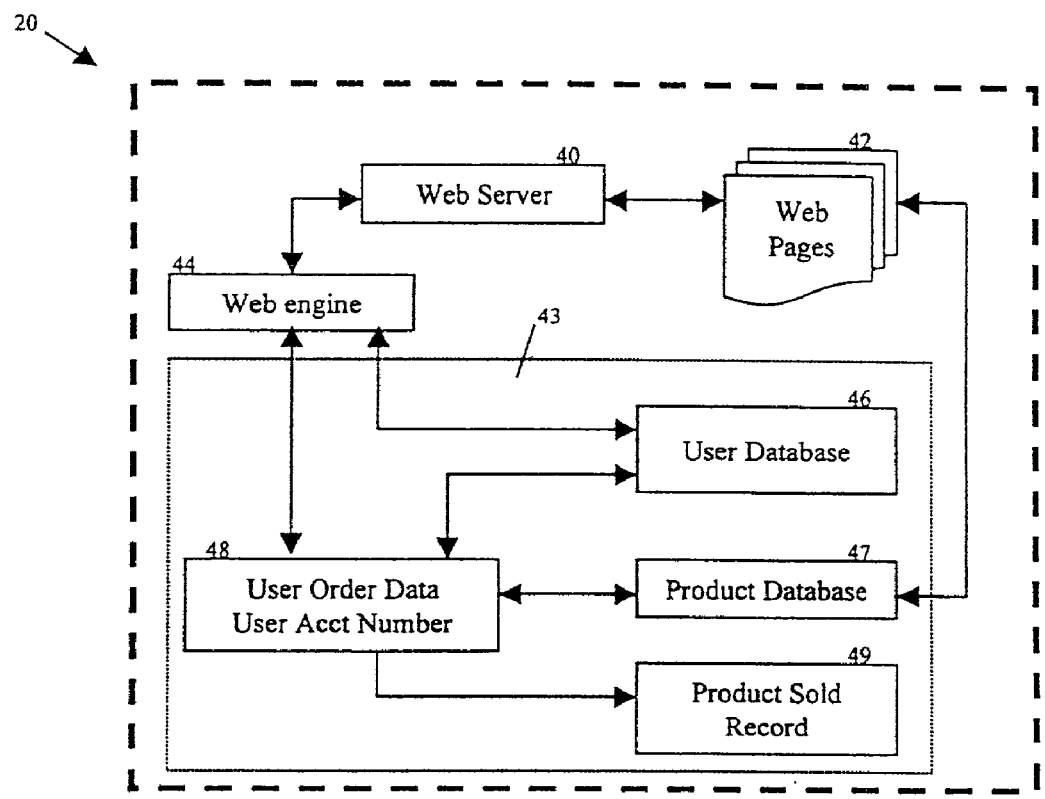
FIG. 2 is a diagram of the software executing on a server built in accordance with the principles of the present invention.

Referring now to FIG. 2, the software executing on server computer 20 is described in greater detail. In a preferred embodiment, server computer 20 executes Web server 40, which communicates across the Internet with numerous Web browsers to provide access to Web pages 42. Web pages 42 may be predefined static Web pages, or may include Web pages that are dynamically generated, using CGI scripts, servlets, or any other technology that permits a Web server to dynamically generate or modify Web pages. For example, Web pages 42 may be generated to contain information on products extracted from products database 47.

Server computer 20 also executes Web engine 44, which handles electronic tokens, as described in detail hereinbelow. Web engine 44 communicates between Web server 40 and database server 43 to handle data on users, user accounts, and other data concerning electronic tokens and users.

Server computer 20 also executes database server 43, which maintains user database 46, product database 47, user order and account number data 48, and product sold records 49. Database server 43 may also manage other databases and tables (not shown) for operating an electronic commerce Web site.

User database 46 contains information on each user of the vendor's Web site, including the user's name or other identifying information, account number, and any personal information on the user (i.e. credit card numbers, phone numbers, address, etc.) that the vendor requires. User database 46 also preferably includes information on the number of electronic tokens available to each user. User database 46 may also maintain data on how the user has spent tokens in the past, on whether the user is a "preferred customer," eligible to receive discounts on token purchases and other bonuses, the user's credit and payment status, and any other information that may assist the vendor to handle and track its customers. The user information in user database 46 may be obtained from a manufacturer or credit institution in embodiments of the present invention (discussed below) in which the manufacturer or credit institution issues tokens to the user that may be used at participating vendors.

Product database 47 contains details about products and services offered and their descriptions. These details preferably include at least a product name and a product price in tokens. Product database 47 may also include a variety of other information about products and services offered by the vendor, including descriptions and images of products, information on the manufacturers of products, additional information on services, information about the availability and stock on hand for products, and other information that would be useful for handling Web-based sales of products and services.

If the products being offered by the vendor include downloadable or rental software, product database 47 preferably contains information about the types of purchase or rental that are offered for each such software product. These types include:

a) permanent use;
b) rental use of a specified fixed time;
c) rental use for a specific number of times;
d) rental use for processing a specific number of a given task;
e) converting rental use from specific fixed time to an unlimited permanent use;
f) converting rental use from a specific number of times to an unlimited permanent use;
g) converting rental use from processing a specific number of a given task to an unlimited permanent use;
h) additional fixed time for an application software already rented;
i) additional number of times to use for an application software already rented; and
j) additional processing of a specific number of a given task via an application software already rented.

Additionally, database server 43 handles user order and account number data 48, which maintains user order data with cross-referencing to the user account number while a client computer and server computer 20 interact. Database server 43 also handles product sold records 49, which keep track of products sold for future updating of products offered at the server. Both the user database 46 and product sold records 49 are updated when a business transaction is completed between a user client computer and server computer 20.

As will be understood by one skilled in the relevant arts, the software that is described hereinabove as executing on server computer 20 may be distributed among multiple server computers. Similarly, the databases and other records and data maintained by database server 43 may be distributed between multiple database servers executing on multiple server computers.

Figure 3:
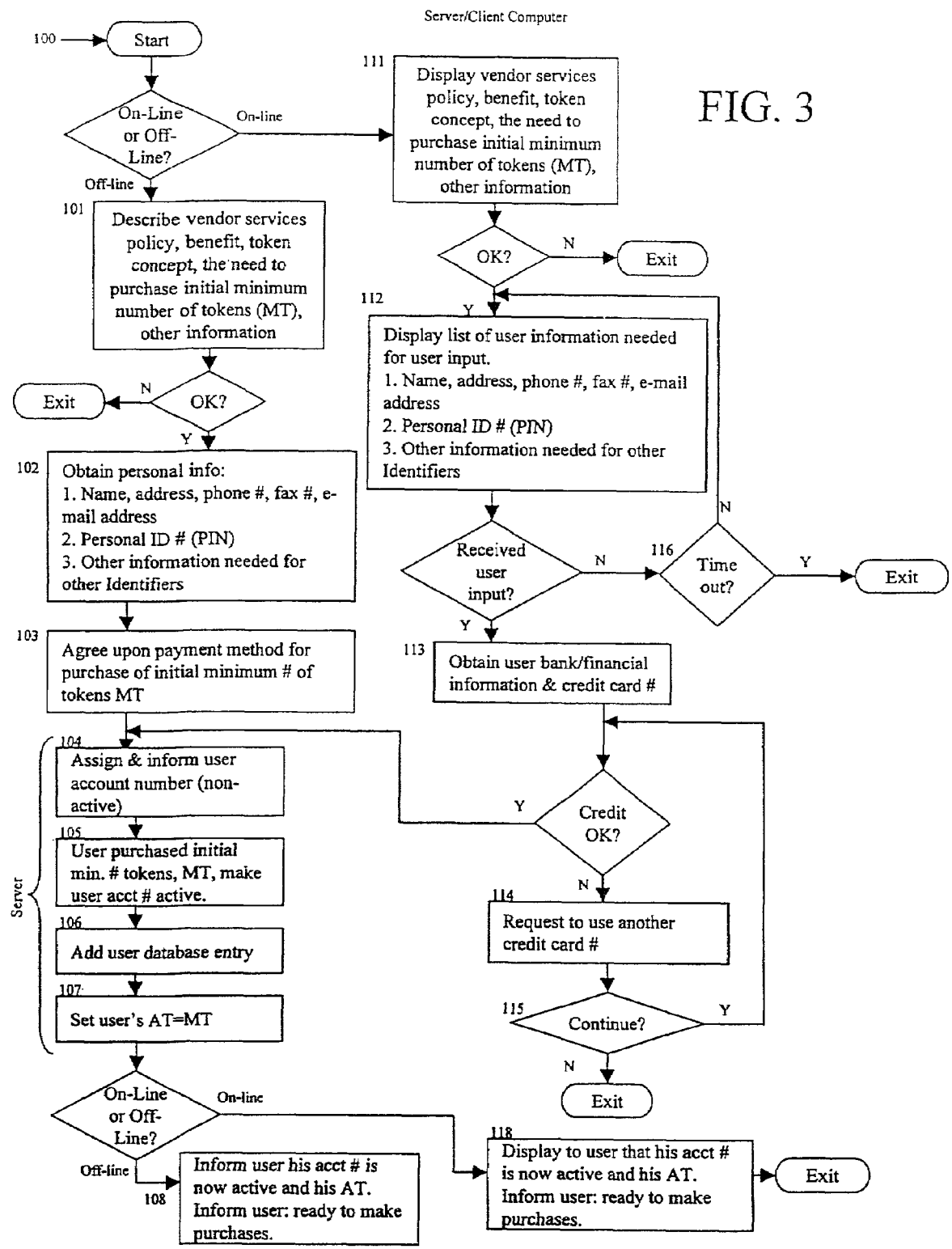
FIG. 3 is a flowchart of a method for establishing a user account.

Referring now to FIG. 3, The process for registering users with the system is described. In a preferred embodiment of the present invention, a user can register and establish an account over the network (on-line method) or using telephone, facsimile machine or mail (off-line method) with a vendor, manufacturer, credit institution, or other account entity. It should be noted that as used herein, the use of e-mail between the user's personal computer (PC) and the account entity is considered an off-line method, since communications using e-mail is not a part of the business transaction between the user's client computer and the account entity's server computer.

The registration and establishment of an account with the account entity either using the on-line method or off-line method requires a user to provide the account entity with personal information, such as name, address, telephone number, facsimile machine number, e-mail address, etc. To properly and securely identify a user, the account entity may require additional private information from the user, that may include the maiden name of the user's mother, the user's social security number, the user's birth date, and a password for use as a Personal Identification Number (PIN). As used herein, this personal private information is collectively called "other identifiers". These other identifiers are used from time to time to assure proper identification of the user. The user may change his PIN at any time if he so desires.

After the user provides the account entity the above information, a user is considered "Registered" and he is assigned an account number. This user account number, however, may be held inactive until the user completes the purchase of an initial minimum number of tokens (MT), as required by the account entity. Alternatively, the account entity may issue a number of tokens to the user when the user opens an account, either for payment of a registration fee, or for free, as an incentive for registration. When this is done, the user's account number becomes active immediately.

Steps 101 through 103 show the process for off-line registration. In step 101 the account entity provides a potential user information about the account entity, participating vendors, or application service provider (ASP) which may include the type of products offered for sale and/or rent, the concept of using tokens, how tokens can be purchased, and the requirement for the user to purchase an initial minimum number of tokens (MT).

If the user wants to proceed, at step 102, he is asked to provide personal information, which normally includes the user's name, address, telephone number, facsimile number, if any, and e-mail address. He also is asked for additional personal information (i.e., other identifiers), which may include a personal identification number (PIN) which will be changeable at the user's request. The other identifiers may also include the user's birth date, his social security number, and his mother's maiden name. This additional personal information (i.e., other identifiers) will be used, if necessary, to ensure correct identification of the user.

In step 103, the user is asked by the vendor how he wishes to pay for the initial minimum number of tokens (MT) required by the account entity. The account entity may, at its option, based on information given to it by the user, accept payment by the user's personal check, via the user's credit card, via a purchase order, or through any other payment method that the vendor is willing to accept from the user.

Once the user and account entity have agreed upon a payment method, the account entity inputs the user's information into server computer 20. At step 104, Server computer 20 assigns a user account number, which will be inactive until the user actually purchases or otherwise acquires the minimum number of tokens.

Next, the account entity informs the user of the account number and that this account will become active only after the purchase or acquisition of the initial minimum number of tokens (MT). When the user's payment for MT is confirmed, or the user otherwise acquires the minimum number of tokens, the server will make the user's account number "Active", create an entry and an account for the user in a database such as user database 46, set the user's available number of tokens (AT) to the minimum number of tokens, or the number of tokens acquired by the user, if the number is larger than the minimum (steps 105, 106, 107). Next, at step 108, the account entity informs the user that his account number is now active and that he is ready to make purchases.

If the on-line method is used, steps similar to those taken in the off-line method are taken, as indicated in steps 111, 112, 113, 104, 105, 106, 107, and 118. In the on-line method, communications between the account entity and the user occur over the network, using Web pages, for example. Additionally, when using the on-line method for payment, the user may be restricted to using a credit card to purchase the minimum number of tokens. If the credit card number given by the user is not accepted by a banking system accessed over the network by server computer 20, server computer 20 will ask the user to provide a different credit card number, as shown in step 114.

To avoid prolonging interaction between a client computer and server computer 20, after several unsuccessful attempts to process a valid credit card transaction, server computer 20 may inform the user and terminate the connection between the user's computer and server computer 20, as indicated in step 115. Similarly, if the user does not complete the requested personal information as indicated in step 112, a time limit is set, after which server computer 20 will inform the user that the connection with his client computer will be terminated, as shown in step 116.

Figure 4:
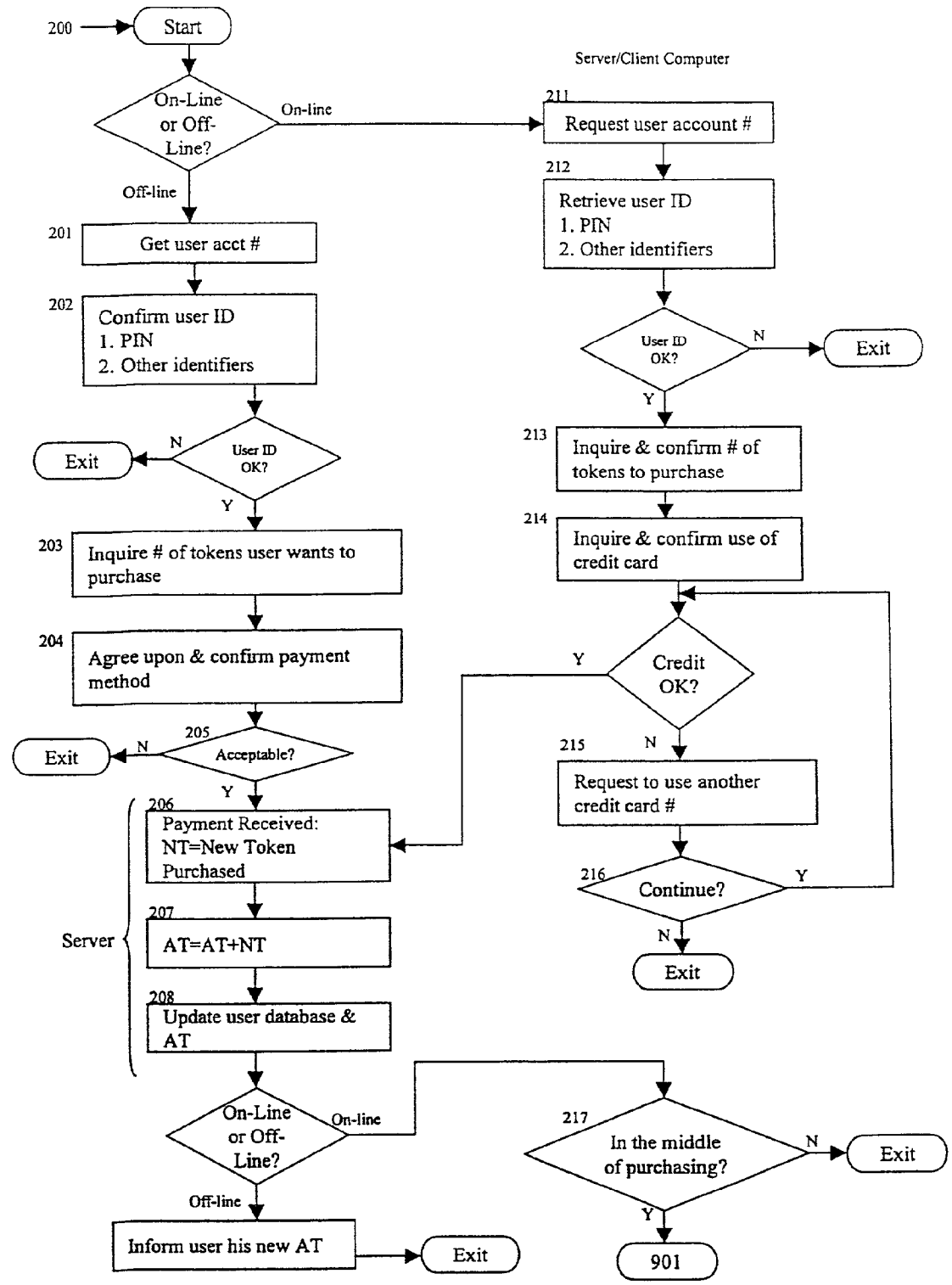
FIG. 4 is a flowchart of a method the permits users to purchase additional electronic tokens, either on-line or off-line.

Referring now to FIG. 4, a method for purchasing additional tokens from the vendor is described. In a preferred embodiment of the present invention, a user may purchase tokens using an on-line method or an off-line method. The minimum number of tokens a user is required to purchase (MT) and the price for each token may vary among vendors. Particularly, variations may exist among vendors in foreign countries and depending on the type or category of products they wish to sell and market on their particular Web site. Additionally, vendors may offer discounted prices for electronic tokens to "preferred" customers, or based on the volume of tokens purchased. In accordance with the present invention, since each vendor issues electronic tokens to be used to purchase its products and services, each vendor may set its own prices and policies for electronic tokens.

When using the off-line method for purchasing electronic tokens, the user may contact the vendor using the telephone, facsimile machine, regular mail or e-mail, and identify himself by giving the vendor his name and account number (step 201). In step 202, the operator further confirms the user's identity by asking for the user's PIN and perhaps other information confirming the user's identity.

At step 203, the user tells the vendor the number of additional tokens he wishes to purchase, and at step 204, the payment method for this new purchase is agreed upon between the user and the vendor. This may include payment by check, purchase order, by the user's credit card, or any other form of payment that the vendor is willing to accept from the user. Once the user's payment method is accepted or payment is received, the vendor will update the user's account in user database 46, and update the number of available tokens (AT) in the user's account (steps 206, 207 and 208). As shown in step 207, the newly purchased tokens (NT) are added to the user's available tokens (AT).

If the user elects to purchase additional tokens using the on-line method, steps similar to those using the off-line method are taken, as indicated in steps 211, 212, 213 and 214. As in the registration process, the communication between the vendor and the user is handled over the network, for example, using Web pages. Additionally, the user's payment options may be limited to using a credit card or other payment method that can be handled over a network such as the Internet. As with the purchase of the initial minimum number of tokens, an attempt to obtain a valid user credit card number will be made by server computer 20, as illustrated in steps 215 and 216.

It should be noted that the user may purchase additional tokens even while he is shopping. For example, if the user is shopping on the vendor's Web site, and discovers that his available tokens are insufficient to cover the total cost of products and services he wishes to purchase, he may elect to purchase additional tokens. In step 217, the server recognizes such situations, and returns control back to the user at his client computer after the tokens have been purchased. The server will display the last Web page viewed by the user when he switched to purchase additional tokens.

Figure 5:
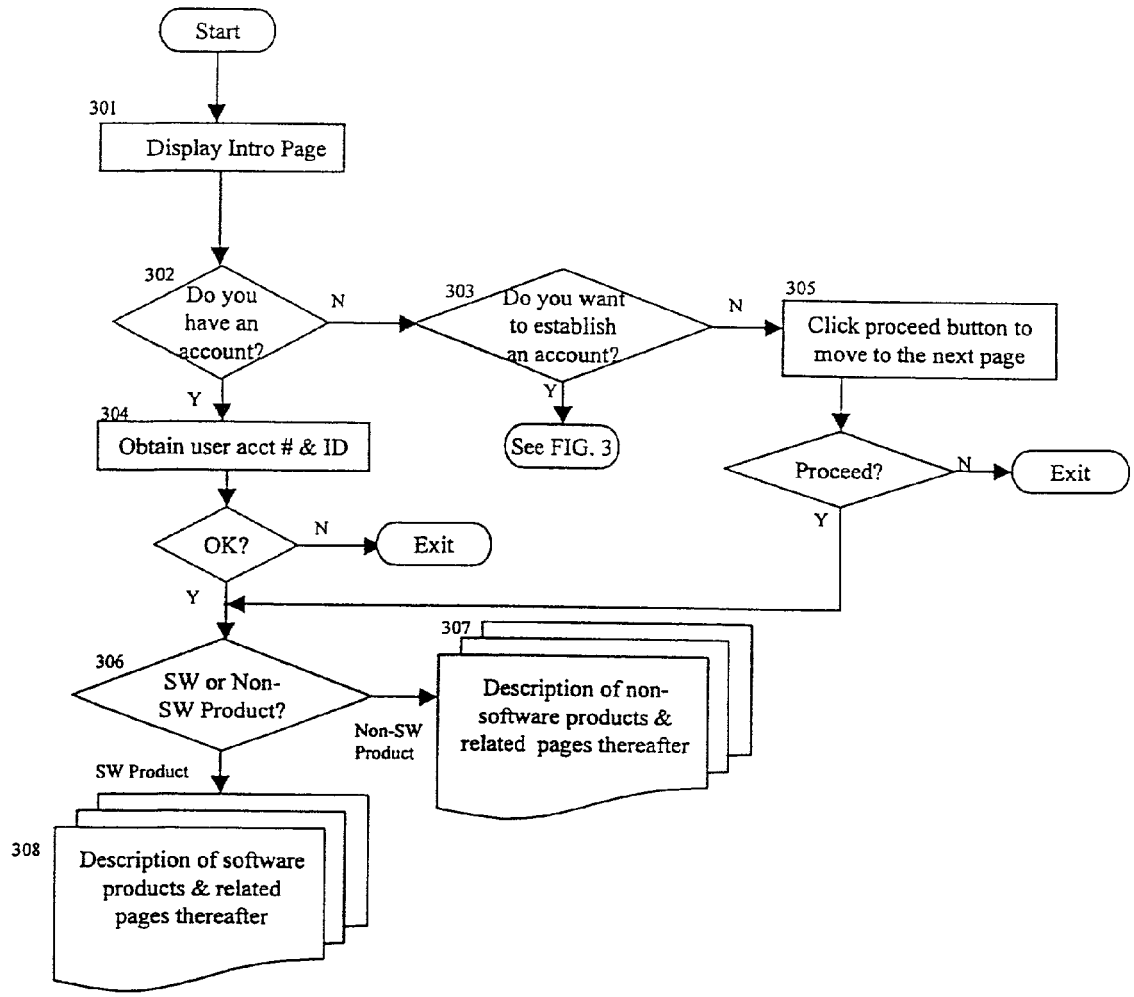
FIG. 5 is a flowchart showing a method for verifying that a user has an account, and for initiating a shopping session.

Referring now to FIG. 5, a method for initiating shopping over the network is described. A user may interact across a network, such as the Internet, with a vendor's server computer 20 using his client computer. Server computer 20 will ask the user whether he has an account with the vendor. If not, the user will be provided information on registration, and may be given an opportunity to open an account with the vendor. At the user's option, he may browse the vendor's Web pages and view various products and services offered by the vendor. If the user already has an account number, the server will verify the user's identity with a password, PIN, by use of other identifiers provided by the user, or by some combination of these.

It should be noted that a user with an inactive account number may browse the vendor's Web pages to view its services and various products being offered, just as may an unregistered user. However, the user may not be permitted to go beyond selected Web pages where cost information is listed and will not be permitted to create an order list and make an order for purchases or rentals. These restrictions are immediately removed when the user acquires the minimum number of tokens, and his account number becomes active. The minimum number of tokens the user purchased becomes his available tokens within the particular vendor Web page from which he purchased the tokens, only for use with that vendor.

In step 301, server computer 20 sends an introductory page for display to a client computer, which displays the introductory page to a user. This page preferably contains a message informing the user of the types of products and services available from the vendor, and that the vendor uses electronic tokens for payment. The introductory page also preferably contains a proceed button, that the user may select if he wishes to proceed, and enter the vendor's Web site, and a quit button, that the user may select if he does not wish to enter. The introductory page may also contain a home button, a back button, a forward button, and a last button, to facilitate rapid navigation through the vendor's Web pages.

It will be understood by one skilled in the relevant arts that display of an introductory page is optional, and some vendors may choose not to use such a page. Additionally, the message displayed in the introductory page will vary, according to the wishes of the vendor. Further, the above-described buttons may optionally be omitted, greyed out if not available, renamed, or displayed in any usable positions on the introductory page. One skilled in the art will further recognize that the introductory page may contain various types of content, including text displayed in a variety of fonts or styles, graphics, animations, sounds, video, or any other content that may be sent across the network from server computer 20 for display on a user's client computer.

If the user chooses to proceed, at step 302 server computer 20 asks the user if he has an account with the vendor. If the user does not have an account, he will be asked in step 303 whether he would like to register and establish an account with the vendor. If the answer is yes, he will be directed to the process of registration (either on-line or off-line), as described hereinabove with reference to FIG. 3. If the user is not ready to register, but wishes to continue browsing the Vendor's site, at step 305 he will be given an opportunity to proceed into the site, but without the ability to complete any purchases without first registering.

If the user already has an account, at step 304, he enters his account ID, preferably a user name or account number, and may be prompted by server computer 20 for further identifying information, such as a password, PIN, or other personal information. If the user correctly identifies himself to the vendor's system, the user may proceed with shopping. Otherwise, the user will be disconnected from server computer 20.

At step 306, the system determines whether the user is interested in purchasing or renting software or non-software products. This determination may be made by asking the user whether he is interested in software products and services or other products. Alternatively, this determination may be automatically made, for example, for vendors who do not sell software, or who only sell or rent software for download.

If the vendor is an application service provider (ASP), who rents or sells software for download, and the user wishes to view the software products being offered, then at step 308, the system displays descriptions of the software products that are available, and the types of purchase and rental that are available for each software product. If the user does not wish to view software products, or the vendor is not an ASP, then at step 307, the system causes the user's computer to display information on non-software products and services.

The information displayed by the vendor or ASP includes the price of each product or service, expressed as a number of electronic tokens. The user's available tokens also is displayed, if the user has an active account number.

Using the displays sent to his client computer by server computer 20, a user may select a subset of the products and services offered, and place the selected products on his order list. As the user adds and removes items from his order list, the total number of tokens required to pay for the selected products and services (RT) is constantly updated and displayed at the user's client computer. In this way, the user is constantly informed whether his available tokens, which is also displayed, will be enough to cover the total cost of his purchases.

If the user's number of available tokens is equal or larger than the number of tokens required for the products and services on the user's order list, the user can simply click an order button on the display to purchase or rent the items on the order list. Server computer 20 will send a confirmation of the user's orders, including information regarding downloading of software products, the total cost of products in numbers of tokens, and the number of tokens that the user has remaining in his account after the purchase.

When the user is satisfied with the order, he can click on an order confirmed button to complete the transaction. When an order is confirmed, server computer 20 will subtract the number of tokens required for the purchase from the user's account, and cause the user's client computer to display an acknowledgment of the purchases. If the user's order list included software, server 20 may start downloading the purchased or rented software products if they are not already installed on the user's computer. If the user has purchased an extension of a rental period on a software product, or the purchased or rented software product is already installed on the user's computer, then server computer 20 will send a new authorization code for the software.

It will be understood by one skilled in the art that the method and system being described in the present invention for using vendor-issued tokens in a networked environment may be applied to both software and non-software products and services. However, the example preferred embodiment described herein will be described in terms of an ASP, that provides software products for sale or rental. The sale or rental of non-software products is similar to the sale or rental of software products, but is somewhat simpler, since there are fewer types of sale or rental of non-software products and services, and sale or rental of non-software products does not involve use of authorization codes. The methods for sale or rental of non-software products and services may be considered a subset of the methods used for sale or rental of software, as described hereinbelow.

Figure 6:
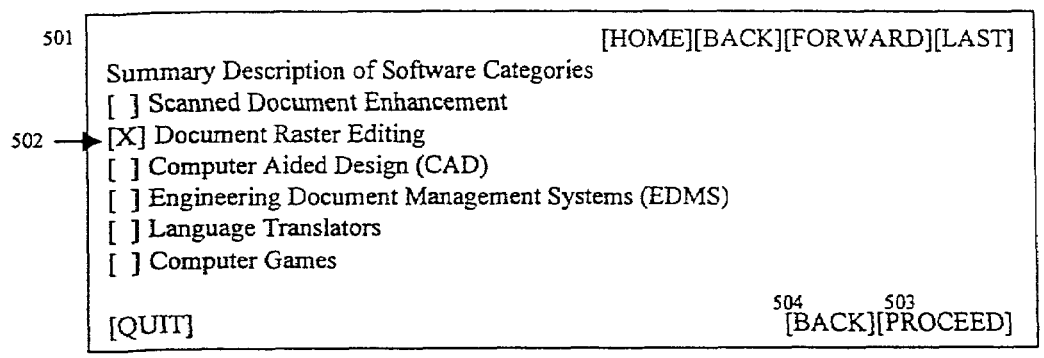
FIG. 6 is an example screen from an application service provider, showing categories of software available for sale or rental.

Referring now to FIG. 6, a screen showing example available categories of software for sale or rental is shown. The example shows software category display 501 for an ASP that offers software products in the field of Scanned Document Enhancement, Document Raster Editing, Computer Aided Design, Engineering Document Management Systems, Language Translators and Computer Games. A user may select one of the categories by clicking the desired category. In this example, the user has selected the Document Raster Editing category as shown with a check mark in corresponding box 502. The user can de-select the selected category by clicking again in the check-marked box. The user can go back to the previous display by clicking on back button 504, or proceed to the next display by clicking on proceed button 503.

In an example shown in FIG. 7, software availability page 601 displays software products A, B, C, and D listed under the selected software category from software category display 501 of FIG. 6. As shown by category headings 602, each software product may be available for purchase, rent by time, rent by number of uses, or rent by number of processings.

Corresponding to each software product and each category heading 602, there is an availability box 603. If an availability box 603 contains a check mark, then the corresponding software product is available in the corresponding category heading. Thus, in the example shown in FIG. 6, software product B is available for purchase or rental by time, software product C is available for purchase or rental by number of times of use, and software product D is available only for rental by number of processing tasks. The user may select the software products and categories of rental or purchase he desires by clicking on the corresponding availability box 603, if that availability box 603 contains a check mark.

Similar to the example shown in FIG. 6, back button 605 allows the user to go back to the previous display or step, and proceed button 604 will allow the user to go to the next step. At the option of the vendor or ASP, use of proceed button 604 may cause the display of a message informing an unregistered user that he must register before he may proceed further. The user may then register with the vendor, following the method described with reference to FIG. 3.

FIG. 8 shows an example of order list display 700, in which the user has specified a subset of the products offered by the ASP as order list 701. With each of the software products in order list 701 the number of tokens required for purchase or rental is shown. In the example, software product A costs 100 tokens, and software product D is available only for rent, with a price in tokens that varies according to the number of processings that the user desires to access. In the example, the user has selected up to 1000 processings, at a cost of 80 tokens.

For the user's convenience, order list display 700 includes RT display 705, showing the total number of tokens required for the purchase, AT display 706, showing the total number of tokens available to the user, and remaining tokens display 707, showing the number of tokens that the user will have left if the purchase is made. Each of these displays automatically updates as the user adds and removes items from his order list.

If the user wants to know more detail about the software in order list 701, he can select a detail button 703 that corresponds to the product about which he would like further information. Additionally, since software product D is being rented, installation query 704 is used to ask the user whether software product D is already installed on his computer. If software product D is not already installed, then server computer 20 must download software product D to the user's computer, along with an appropriate authorization code. Otherwise, if software product D is already installed, then server computer 20 need only send a new authorization code for the rental of software product D to be extended, saving download time and bandwidth.

Although user database 46 on server computer 20 may maintain information on whether the user has downloaded a selected software product in the past, it is still desirable to confirm with the user that the selected software product is installed, since the user may have removed the software product from his computer, or may be accessing the ASP's Web site from a different client computer. Alternatively server computer 20 may automatically check for the presence of a selected software product on the user's client computer by causing the client computer to execute an applet or other code to check for the presence of the selected software product.

Order list 701 may be modified by the user by clicking on the selection box next to the product to be added or removed. If an empty selection box is clicked, a check mark will appear in the box, indicating that the product has been selected. If a selection box containing a check mark is clicked, the check mark will be removed, and the product will be deselected. As products are selected and deselected in order list 701, RT display 705, AT display 706, and remaining tokens display 707 are automatically updated to reflect the number of tokens required for the purchase, the number of tokens available to the user, and the number of tokens that would remain in the user's account if the purchase were completed. Once the user is satisfied with the contents of order list 701, his order may be entered by selecting order button 708.

As in other displays, back button 709 will return the user to a previous display if selected. Quit button 710 will immediately end the user's connection with the ASP's Web site, without completing the transaction.

FIG. 9 shows an example of order display 800. In this display, server computer 20 shows the details of the user's order in response to the user's clicking order button 708. Final RT display 801 shows the total number of tokens required for the purchase. User AT display 802 shows the number of tokens that the user has available at the time of purchase. New AT display 803 shows the number of tokens that the user will have available in his account after the purchase has been completed. In the example shown in FIG. 9, the purchase will require 180 tokens out of the user's 500 available tokens, leaving the user with 320 tokens after the purchase is completed.

If the user wishes to complete the order, he can click on order confirmed button 804, indicating that the order is acceptable. When order confirmed button 804 is clicked, server computer 20 will cause a message thanking the user for his purchase (not shown), and may start downloading any software products that need to be downloaded to the user's computer. This completes the business transaction and the user may click quit button 806 on the display to disconnect his client computer from server computer 20. If the user wants to change his order before confirming it, he can click on back button 805, to return to the previous display.

It will be understood by one skilled in the art that the example displays shown in FIGS. 6, 7, 8, and 9 may be modified in many ways without departing from the invention. The layout of the elements on the page, the wording of the text, and even the presence or absence of many of the elements shown in these displays may be altered. For instance, for a non-ASP vendor, which does not offer software for download, installation query 704 of FIG. 8 would not be needed, and would not be displayed. Many other such modifications to the display layout and user interface may also be made, depending on the needs and desires of the vendor or ASP.

Figure 10:
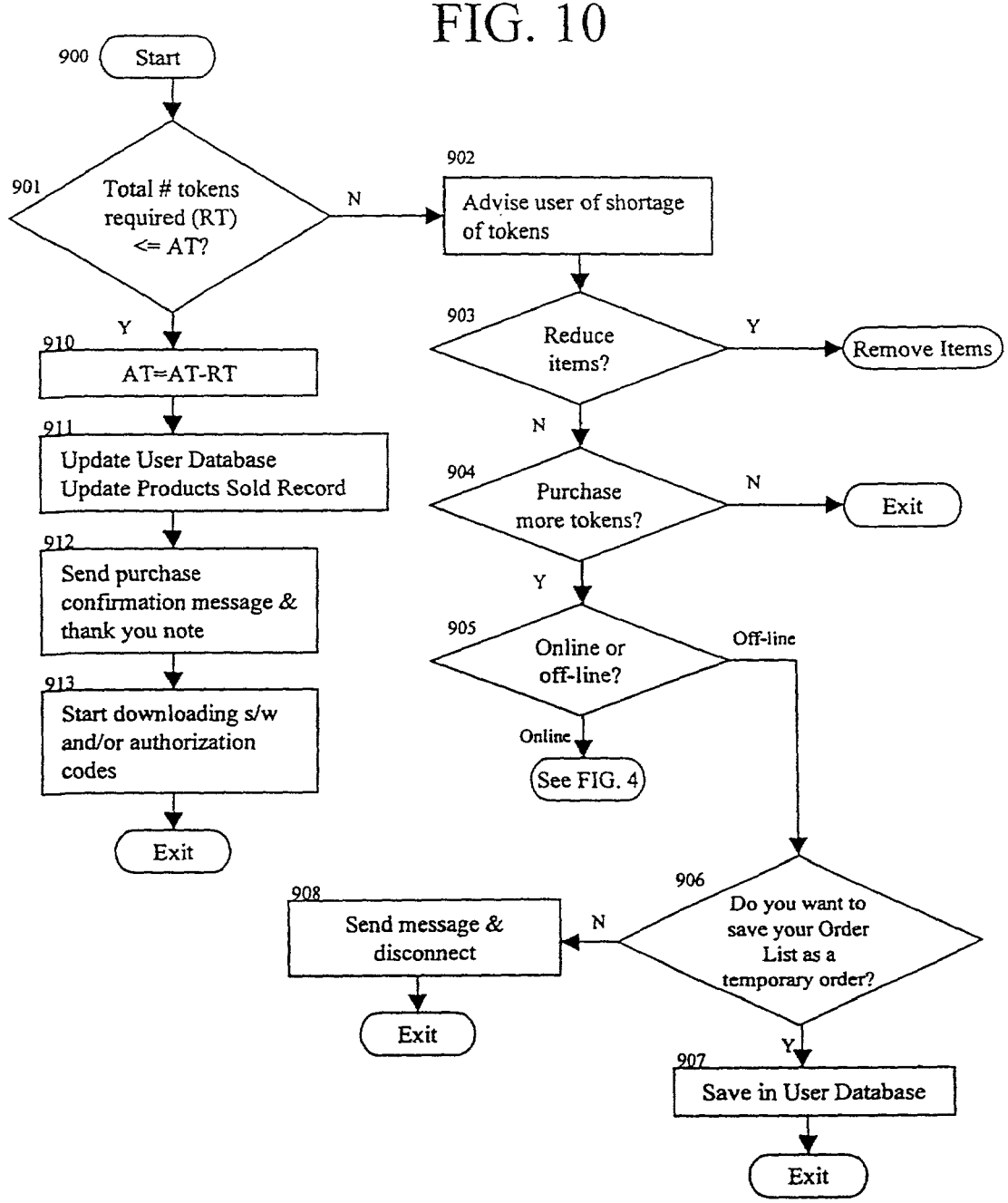
FIG. 10 is a flowchart showing a method for verifying that a user has enough tokens to complete a purchase.

Referring now to FIG. 10, a method for handling purchases is described. When a user places an order, as described hereinabove, the user's available tokens must be updated. In some cases, a user may attempt to place an order even though he does not have enough tokens available in his account to cover the order. If the number of tokens required for a purchase is larger than the number of tokens available in a user's account, the server will advise the user to either remove items from his order list to reduce the number of tokens required, or to purchase additional tokens. The additional tokens can be purchased immediately using the on-line method or the user may purchase additional tokens using the off-line method.

In step 901, the system checks the total number of tokens required for a purchase (RT) against the number of tokens available to the user (AT). If the user has too few tokens to cover the purchase, at step 902, the user is advised of the shortage of tokens. The user is then given the options of removing items from his order list (step 903) or purchasing more tokens (step 904).

If the user chooses to remove items from his order list to reduce the required number of tokens, he may return to an order list display, such as the one shown in FIG. 8. If the user decides to purchase more tokens from the vendor or ASP, he must decide whether to use the on-line purchase method or the off-line purchase method (step 905).

For the on-line method, the user may use a credit card, as described hereinabove with reference to FIG. 4. If the off-line method is chosen, it may not be possible for the vendor or ASP to immediately issue additional tokens to the user, since, for example, the vendor may have to wait for a check from the user to arrive in the mail and be processed by the user's bank. So the user does not have to go to the effort of rebuilding his order list when he has acquired enough tokens, he will be asked to if he wants to save his order list (step 906). If the user wishes to save his order list, server computer 20 will save the order list in user database 46 as a temporary, uncompleted order list, in step 907. In step 908, if the user does not wish to save the order list, the server will send an appropriate message and disconnect the client computer.

If the number of tokens required for the purchase is less than or equal to the number of available tokens, and the user clicks on order confirmed button 804. Then, at step 910, server computer 20 updates the number of tokens available in the user's account. This is done by subtracting the number of tokens required for the purchase (RT) from the number of available tokens (AT), and saving the new number of available tokens. Server computer 20 then updates the user database 46, and product sold records 49 (step 911), and sends a purchase confirmation message and thank you note to the user (step 912).

Finally, at step 913, if the user has purchased or rented any downloadable software, server computer 20 downloads any software or authorization codes that must be downloaded to the user's computer. As explained above, this may include a step (not shown) of determining whether the software has already been installed on the user's computer. If the needed software is already installed, then only an authorization code need be downloaded. It will be understood by one skilled in the art that for vendors who do not offer downloadable software (i.e. the vendor is not an ASP), step 913 is unnecessary.

Figure 11:
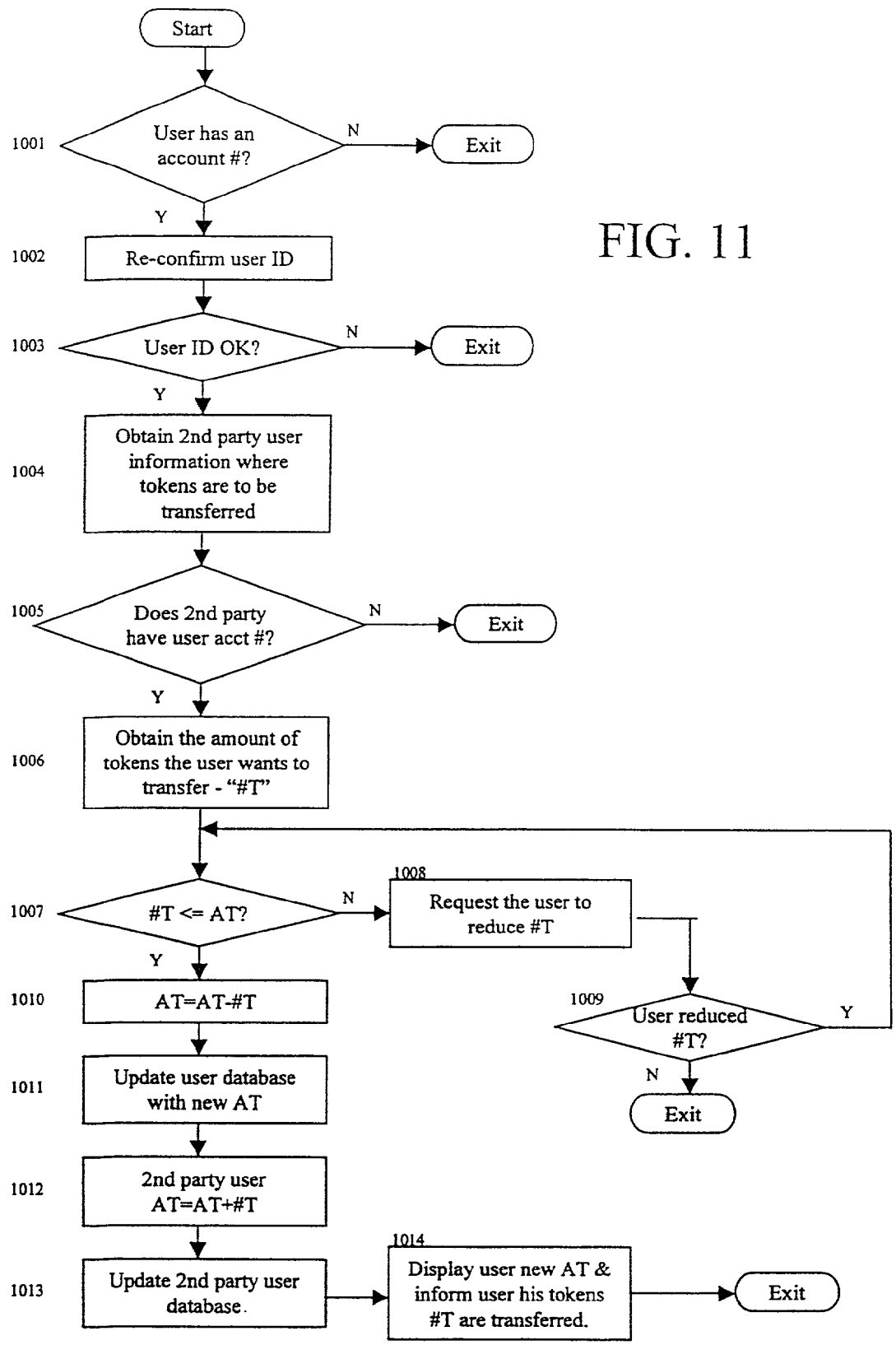
FIG. 11 is a flowchart of a method for transferring electronic tokens from one user to another.

Referring now to FIG. 11, a method of transferring electronic tokens from the account of one user to another user's account is described. Such transfers provide a way for users to exchange electronic tokens issued by a vendor. This may be useful, for example, for conducting on-line auctions, in which one user of an auction Web site bids on products or services offered by another user of the auction site. Instead of sending money to the seller to pay for goods, the buyer transfers electronic tokens issued by the auction site to the seller. Transfer of tokens also may be useful on sites where the vendor does not allow tokens to be converted back to real money, as a way of giving unused tokens to those who may be able to use them.

At step 1001, server computer 20 will ask the user his account number. Next, at steps 1002 and 1003, server computer 20 will request other personal information, such as a PIN number from the user, to further verify the user's identity.

Having verified the identity of the user from whom the tokens are being transferred, at step 1004, the system next obtains the identity of the second party to whom the tokens are being transferred. In a preferred embodiment, the identifying information on the second party includes several fields, such as a name and address, that can be cross-checked, to confirm that there has not been an error in entering the information on the second party. To further confirm that there is no error, the user conducting the transfer may be asked whether he knows the second party's user account number. If this is not known, the server will obtain the account number from user database 46, and check to see if the second party is registered and has an account number with the server. If the server failed to find the second party's record with a valid account number, it will so advise the user and terminate the connection, as shown in step 1005.

If the second party has an account number, at step 1006, server computer 20 will ask the user the number of tokens he wants to transfer. In step 1007, server computer 20 will verify that the user has enough tokens available to allow the user to make the requested transfer. If not, in step 1008, the server will request that the user reduce the number of tokens to be transferred, advising him that the number of tokens available to him is insufficient. If the user does not wish to reduce the number of tokens being transferred, at step 1009, the transfer operation will end without completing the transfer of tokens. Alternatively, the vendor may offer to sell the user additional tokens, so that the transfer may be completed.

If the number of tokens being transferred is less than or equal to the number of tokens available in the user's account, then at step 1010 and 1011, server computer 20 subtracts the number of tokens being transferred from the user's account, and updates user database 46 with the new number of tokens, and a record of the transaction. At steps 1012 and 1013, the transferred tokens are added to the account of the second party (i.e. the recipient), and user database 46 is updated to record the transfer of the tokens. Finally, at step 1014, server computer 20 displays the user's new number of available tokens, and informs the user that the designated number of tokens have been transferred to the second party.

In accordance with the principles of the present invention, since the vendor controls all aspects of token use on the vendor's site, tokens may only be transferred between users with accounts maintained by that vendor. Thus, tokens issued by one vendor may not be transferred to an account maintained on a different vendor's system. Similarly, tokens purchased from one vendor cannot be used to purchase products or services at a different vendor's site.

Figure 12:
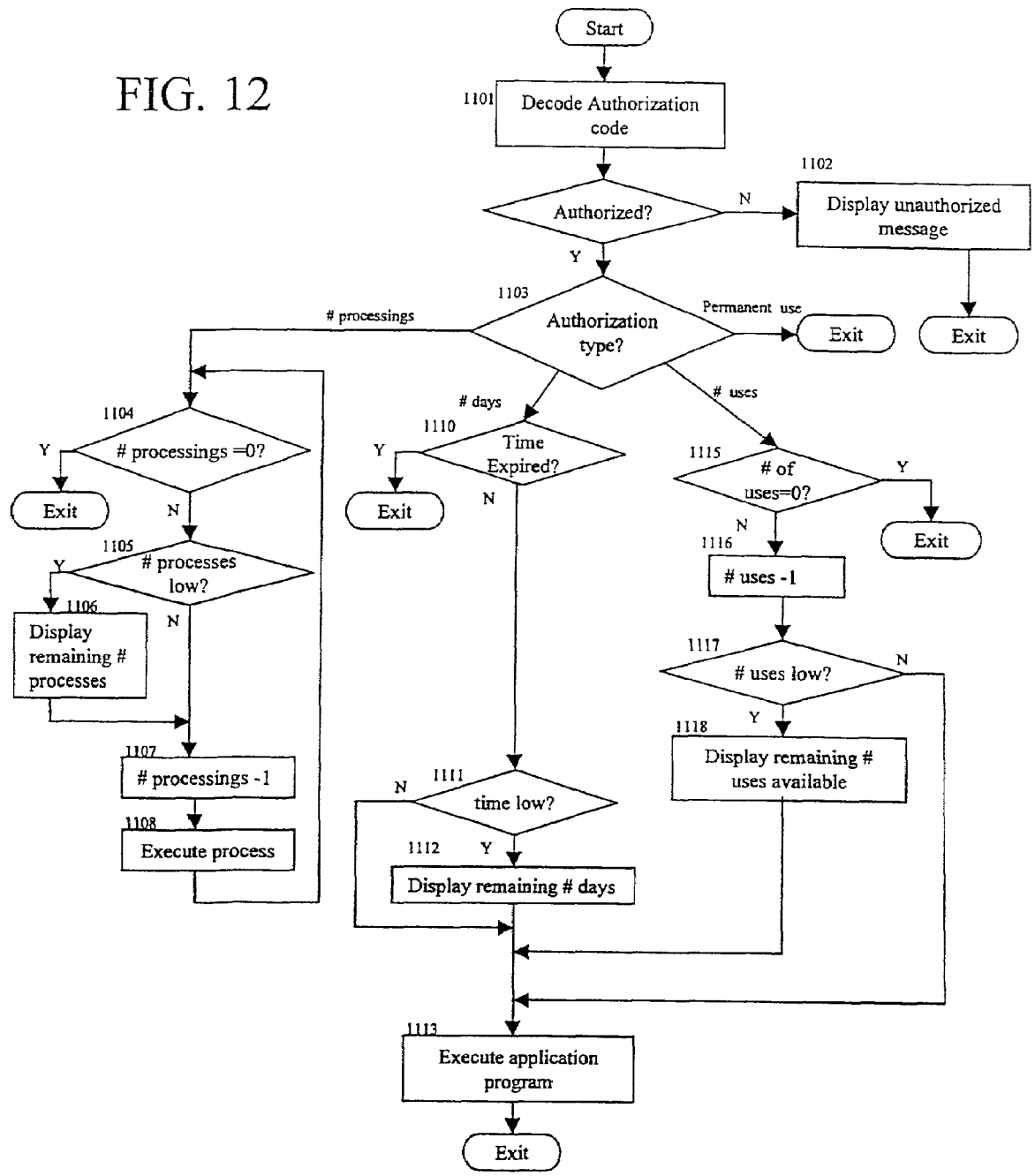
FIG. 12 is a flowchart of a method for verifying that use of rental software is authorized.

Referring now to FIG. 12, a flow chart illustrating a method of verifying authorization codes for use with rental software is shown. As explained hereinabove, through use of electronic tokens, users are able to make micropayments and conduct other low-overhead transactions that make rental of software products for a limited number of uses or a limited number of processings practical. Application service providers (ASPs) may offer access to a variety of downloadable software for purchase or rental. To insure that users do not exceed their allotted rental period, an authorization code is sent to the rental software that allows it to determine whether its use is authorized.

At step 1101, the software decodes the authorization code. Typically, authorization codes will be encrypted or otherwise encoded with information such as a time stamp or authorization code number that prevents a user from altering or duplicating an authorization code. Thus, to use an authorization code, the code should first be decrypted or decoded.

At step 1102, if the decoding of the authorization code failed, and use of the software product is not authorized, the software will display a message to the user advising him that the software is not authorized, and exit. Additionally, the software may automatically invoke a Web browser or other network tool to connect the user to an ASP who can sell the user a new authorization code for the software, in exchange for electronic tokens.

At step 1103, if the authorization code was valid, the software determines the type of the authorization code. If the authorization code authorizes permanent use of the software product, the verification process is over, and the software may execute. Otherwise, the authorization software must determine whether there is any time, uses, or processings left on the authorization code, depending on the type of authorization code.

If the authorization code is of a type that permits a number of processings, the software checks to see if the number of processings is zero (step 1104), or low (step 1105). If there are no processings left, the software displays a message, and exits. If the number of processings remaining is low, the software displays a message warning the user that the number of processings is low (step 1106), and continues. In either of these cases, the user may be automatically connected with an ASP, and be given the opportunity to use electronic tokens to purchase additional processings.

If the authorization code indicates that there are still processings remaining, at step 1107, the software subtracts one from the number of processings, and at step 1108, the process is executed. Once the process is finished, it may be repeated until no processings remain.

If the authorization code is of a type that permits a number of days of use, or another time-based rental, the software checks to see if there is any time remaining (step 1110), or if the remaining time is short (step 1111). If the time period of the rental has expired, the software displays a message, and exits. If the remaining time is short, the software displays a message warning the user that the amount of time remaining is low (step 1112), and continues. In either of these cases, the user may be automatically connected with an ASP, and be given the opportunity to use electronic tokens to purchase additional time on the rental. If the authorization code indicates that there is still time remaining, at step 1113, the application program is executed.

If the authorization code is of a type that permits a fixed number of uses of the application program, the software checks to see if there are any uses remaining (step 1115). If so, one use is subtracted from the remaining uses (step 1116), and the software checks to see if the remaining number of uses is low (step 1117). If the remaining number of uses is low, the software displays a message warning the user that the number of uses remaining is low (step 1118), and continues. In either of these cases, the user may be automatically connected with an ASP, and be given the opportunity to use electronic tokens to purchase additional uses of the rental software. Finally, at step 1113, if there was at least one remaining use of the software, the application program is executed.

It will be understood by one skilled in the art that there may be other terms for which software may be rented, and that the above-described authorization method could be easily modified to handle other types of software rental. The ability to use electronic tokens to reduce the overhead of software rental transactions, and the use of authorization codes to verify the legitimate use of rented software and to avoid unnecessary downloads facilitate a variety of software rental models.

While preferred illustrative embodiments of the present invention are described above, it will be evident to one skilled in the art that various changes and modifications may be made without departing from the invention. For example, electronic tokens may be given away in contests or as incentives, or different forms of on-line and off-line payment may be accepted at the option of vendors.

In another embodiment of the present invention, an entity called a Mall Service Provider (MSP) may regulate the electronic token system. The MSP authorizes certain vendor web sites to issue its electronic tokens to customers who use them to conduct electronic transactions. The MSP keeps accounting records of various data relating to the electronic tokens, as is discussed in further detail below. For example, the MSP may keep records indicating the number of tokens authorized to each vendor, the number of customers who receive tokens, and detailed account information relating to each customer and each electronic transaction involving the electronic tokens. Using an MSP to coordinate the electronic token system of the present invention provides several advantages. For example, customers can use tokens they received from one vendor to purchase items sold at other vendor web sites that are also registered with the same MSP. Details of these features are discussed further below with respect to open token systems.

Presently, closed token systems of the present invention are discussed. Electronic tokens may be issued by a vendor web site to its customers for conducting electronic transactions through its web site. If the tokens are usable by customers only to purchase items sold by that vendor, then the vendor comprises a closed system. In the present application, vendors are also referred to as vendor malls and vendor web sites.

Figure 13:
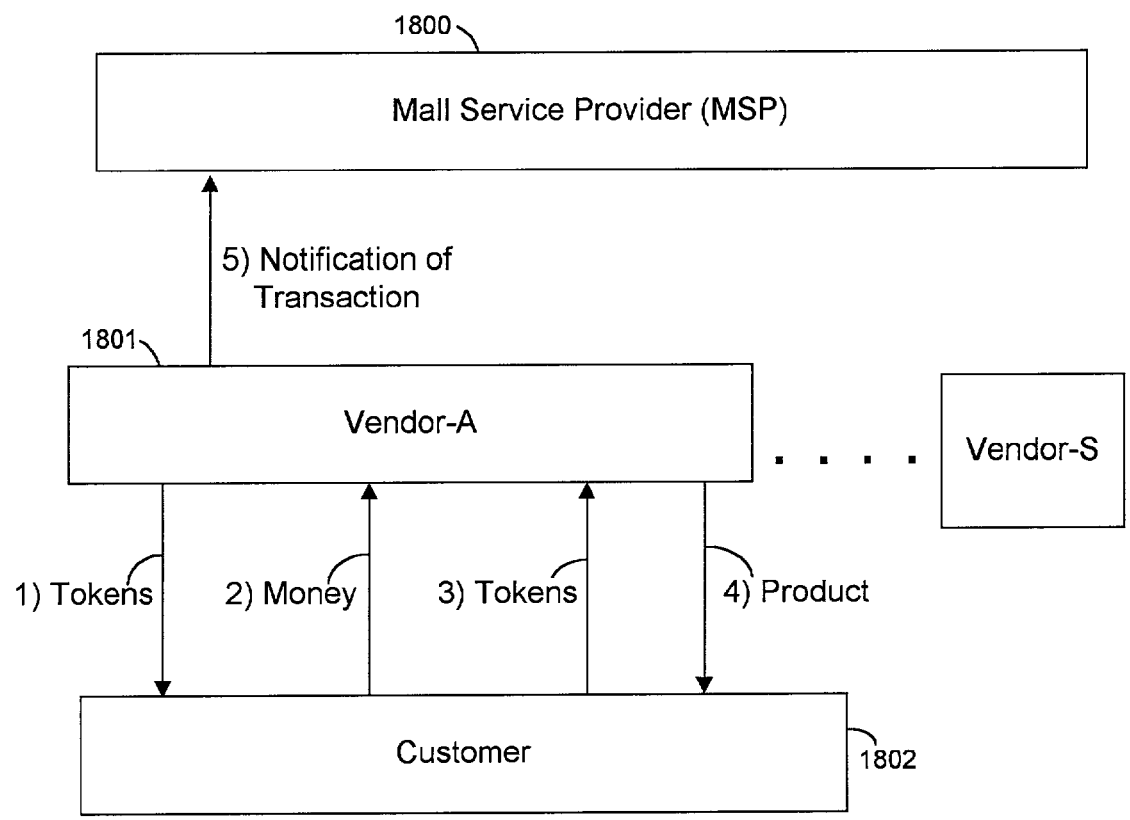
FIG. 13 is a description of a business transaction of the present invention that takes place in a Closed System.

Tokens may be exchanged between a vendor and a customer in a closed system. FIG. 13 is a diagram showing steps of an illustrative business transaction involving electronic tokens. Business transactions involving other steps are also possible. Referring to FIG. 13, Vendor-A 1801 may issue tokens to customers to sell or rent its products and services. The tokens have a value set by Vendor 1801, and the tokens may or may not have an expiration date. Vendor-A 1801 may, at its own discretion, sell tokens with quantity discounts. For example, a "Silver Token" is a set of 100 tokens with 5% discount and a "Gold Token" is a set of 200 tokens with a 10% discount. Vendor-A 1801 also may sell Restricted Tokens at any level of discount, but these tokens only can be used by customers to purchase certain products ON SALE. Additionally, Vendor-A 1801 may issue free tokens to customers, as an incentive to reward customer loyalty, in a manner similar to frequent flyer programs. The tokens issued by Vendor-A 1801 are Closed Tokens that are good for purchasing (or renting) products and services offered by Vendor-A 1801 only. Vendor-A 1801 Mall, therefore, is a Closed System.

Customer 1802 in FIG. 13 may be an individual person or a business entity including another Vendor. Therefore, the Closed Token System permits both business-to-consumer and business-to-business transactions. FIG. 13 shows exemplary steps in a transaction involving tokens of the present invention in a Closed System.

Initially, customer 1802 requests Vendor-A 1801 to register and set up an account, either on-line or off-line. Vendor-A 1801 responds by requesting customer 1802 to purchase a certain amount of its Closed Tokens. In FIG. 13, Vendor-A 1801 chooses to give customer 1802 a certain amount of its Closed Tokens prior to receiving payment as shown in step (1). Customer 1802 makes the payment some time after receiving the closed tokens in his account, as shown in step (2). Note that the operator of Vendor-A 1801 may, at his own discretion, provide its Closed Tokens to customer 1802, before or after receiving payment from customer 1802. In the latter case, steps (1) and (2) in FIG. 13 are reversed.

Customer 1802 then decides to purchase or rent product(s) or services from Vendor-A 1801 using the Closed Tokens. Vendor-A 1801 subtracts the number of Closed Tokens required for purchases by customer 1802 from his account, as payment by customer 1802, as shown in step (3). Vendor-A 1801 then delivers the product(s) to customer 1802, as shown in step (4). In step (5), Vendor-A 1801 notifies MSP 1800 of its business transactions with customer 1802.

Vendor-A 1801 pays a royalty to MSP 1800 for use of tokens after the business transaction. The royalty payment may be done in a variety of ways. For example, the MSP could immediately debit Vendor-A's account established with the MSP. This would be a deduction from any amounts that Vendor-A has deposited with MSP in order to establish an account. Or, this royalty payment from Vendor-A 1801 to MSP 1800 may take place at a later date at a pre-determined time interval, such as at the end of each month, if such agreement has been made between Vendor-A 1801 and MSP 1800 in advance.

Information relating to customers and electronic tokens are maintained in databases in the MSP server. If desired, information relating to customers and electronic tokens may also be maintained in the vendor server. Referring to FIG. 14, MSP server 1900 creates a customer record 1901 for each new user, whenever a new user registers and establishes an account with Vendor-A. Customer record 1901 may contain the customer's personal information such as name and address, a personal ID number, a PIN number, an account number, credit card account number, and billing information. Customer record 1901 may also contain information as to what types of purchases customer 1901 has made in the past and the customer's preferences such as favorite products, brands, types of products, or services. The customer's preference information may be obtained by querying customers or by evaluating the user's past purchases. Customer record 1901 is updated whenever a customer changes his address, password or any other private information. Vendor server 1910 may have customer record 1911, which contains some or all of the customer information maintained in customer record 1901.

Closed token record 1902 at MSP server 1900 contains information regarding the customer's account. For example, record 1902 may contain the number of closed tokens a customer has currently available in his account. Whenever a customer purchases any Closed Tokens or any free tokens are issued to any customer by Vendor-A or a customer purchases products and the required tokens (RT) to pay for products or services are subtracted, the closed token record 1902 in the MSP server 1900 is updated. Because the MSP maintains updated account information on each customer that has a token account, the MSP can easily determine the amount of royalty payments and service charges that the vendor web sites owe to the MSP. The royalties that vendor web sites pay to the MSP may be based upon the number of tokens required for the business transaction between the vendors and the customers. If desired, a closed token record 1912 may also be maintained at vendor server 1910. Closed token record 1912 may contain the same data that is stored in closed token record 1902, such as the current number of tokens in the customer's account.

The method and system of the present invention also provides the means for immediate restoring of customer records and/or closed token records should any record, either in the MSP or Vendor-A server, is destroyed or compromised by unexpected sources. Thus, MSP 1900 server and Vendor A server 1910 may serve to back-up each other.

A further embodiment of the present invention called an open system is now described. In an open token system, a user who registered with a vendor web site is allowed to purchase products or services from other vendors who also accept the electronic tokens. The Mall Services Provider (MSP) authorizes electronic tokens to a first web site vendor. The first web site vendor may issue Type-A tokens to customers to use in electronic transactions through its web site. The customer may wish to purchase items sold through a second vendor that accepts its own Type-B electronic tokens, but does not accept the first vendor's Type-A tokens. In one type of an open token system, customers who received Type-A Tokens from the first vendor can purchase products and services from the second vendor's web site by exchanging Type-A tokens for the second vendor's Type-B tokens. Thus, the customer does not have to obtain tokens issued by the second vendor. A user is not required to repeatedly register at every Web Site where he wishes to make purchases, provided that the second web site accepts tokens type-A from the first web site. The transfer of tokens between one vendor to the other and settlement of money associated with transferring of tokens between Malls are performed by the MSP.

Figure 15:
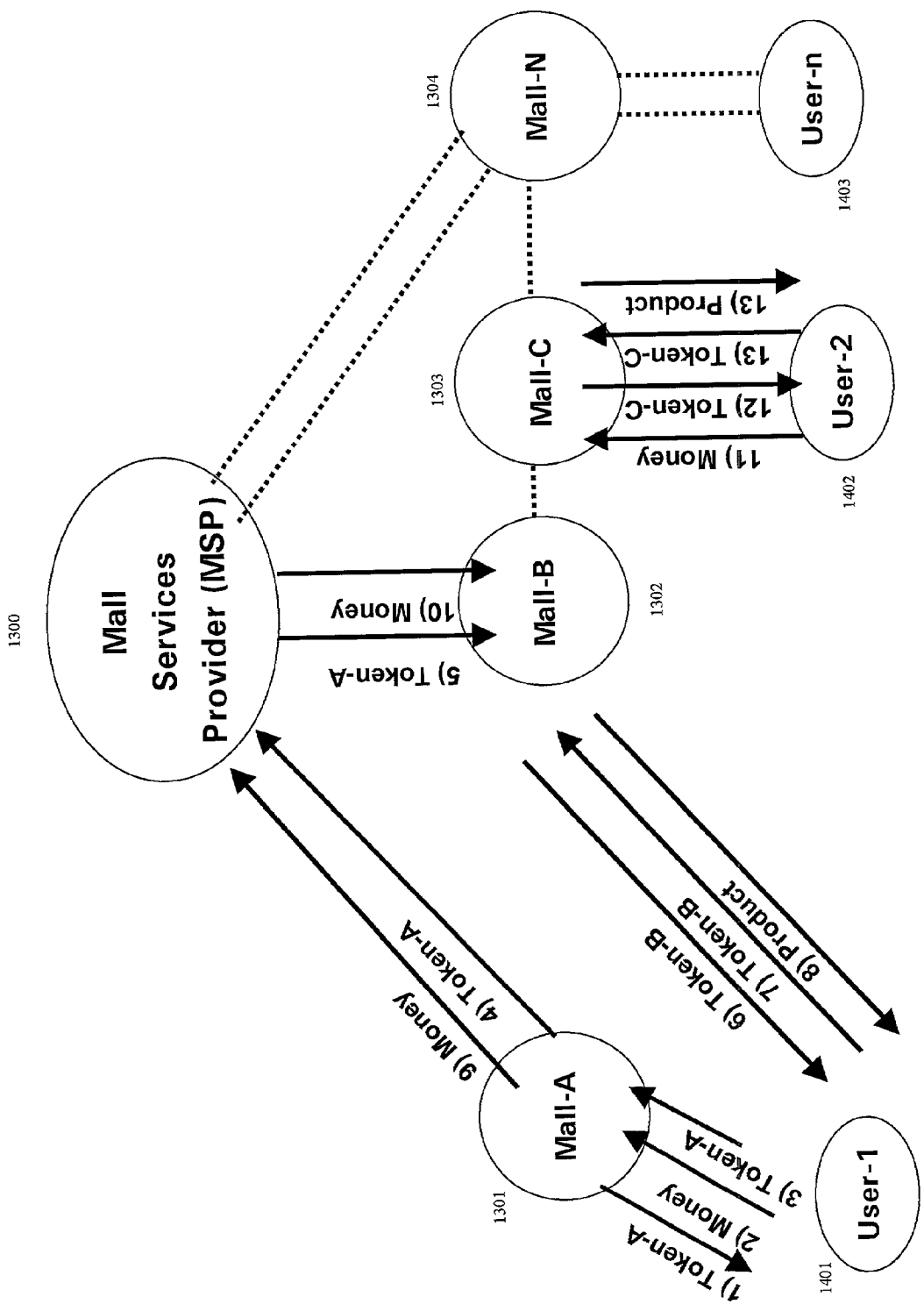
FIG. 15 is an example of an open system process in which a user registered at a first vendor may exchange tokens he received from the first vendor for tokens issued by a second vendor through the Mall Services Provider.

A diagram showing steps for illustrative business transactions involving electronic tokens exchanged between vendors is shown in FIG. 15. Business transactions involving other steps are also possible. Referring to FIG. 15, each of the solid arrows indicates steps (1)-(14), which represent a transaction in the direction of the arrow. User 1, 1401 receives a certain amount of Token-A issued by Mall A, 1301, as shown in Step (1). User 1 pays Mall A for the cost of Tokens-A that he purchased, as shown in Step (2). Note that the operator of Mall A 1301 may, at his own discretion, provide a certain amount of Tokens to user 1, 1401, prior to receiving payment from user 1. Alternatively, the operator of a vendor mall such as Mall C 1303 may choose to have User 2 1402 make the payment at Step (11) before Mall C issues Tokens-C to User 2 in step (12).

In FIG. 15, User 1 1401 wants to purchase products offered by Mall B 1302. User 1 requests Mall A 1301 to transfer a certain amount of Token-A to Mall B 1302 and to receive the equivalent value of Token-B from Mall B 1302. Steps (3), (4), (5) and (6) show the process of token transfer for User 1 1401 from Mall A 1301 through the MSP 1300 to Mall B 1302. Steps (7) and (8) show that User 1 1401 purchases products from Mall B 1302 using Token-B. Mall A 1301 at the request of User 1 1401 transfers a certain amount of Token-A purchased by User 1 to Mall B. Mall B then issues an equivalent value of Token-B to user 1 at Mall A's request. Mall B then receives payment for that amount of Tokens-B it issued to user 1 from Mall A. The settlement of the payment between Mall A and Mall B is performed by MSP 1300, as shown in Steps (9) and (10).

Similarly, a user registered at Mall B 1302 may purchase products and services offered at Mall A 1301 by requesting Mall B 1302 to transfer a certain amount of Tokens-B to Mall A 1301 through the service of MSP 1300. Users 1401 and 1402 may be individuals or businesses including other vendors. Therefore, the open Token systems of the present invention facilitate business-to-business transactions (B2B) and business-to-consumer transactions (B2C).

Figure 16:
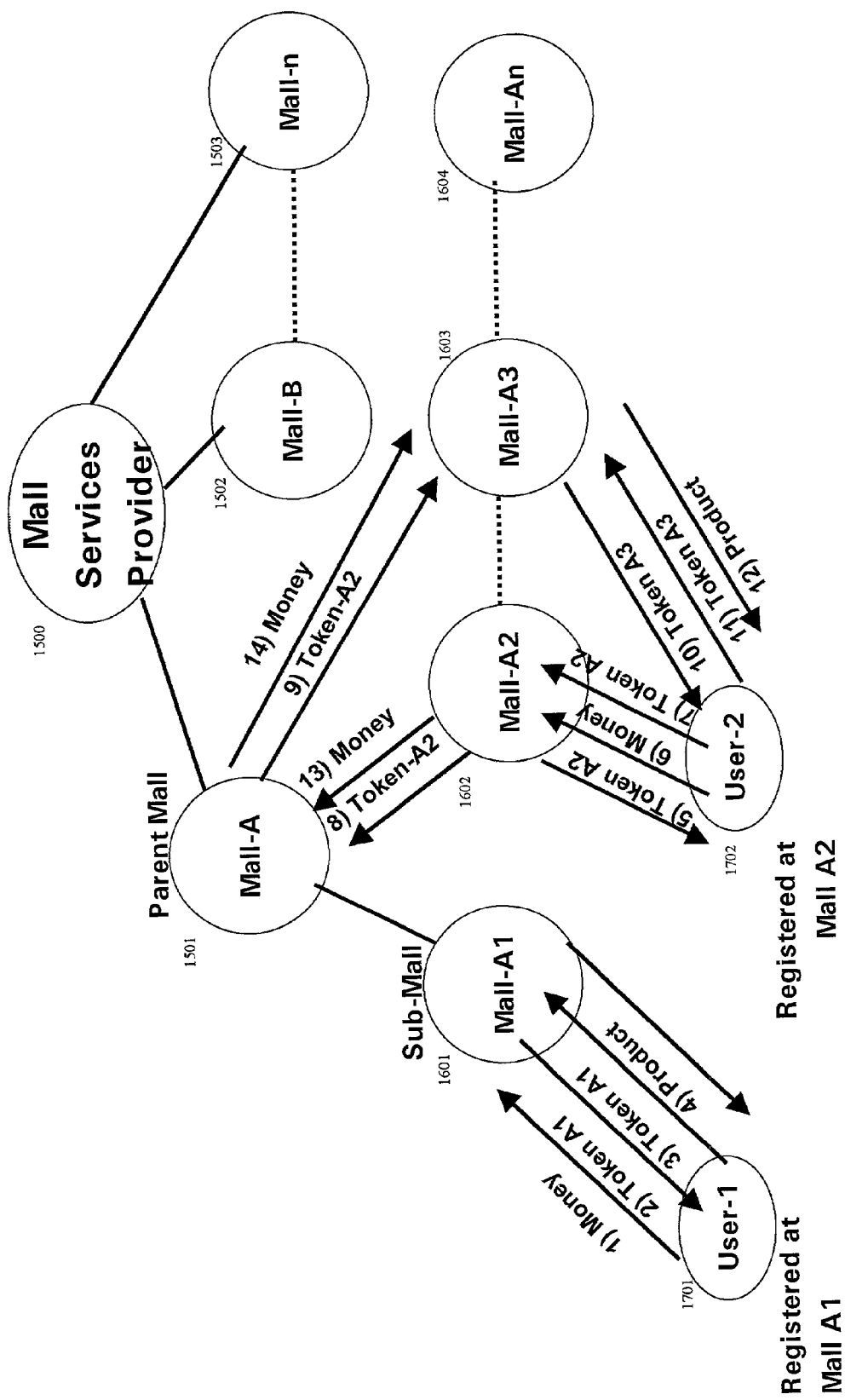
FIG. 16 is another example of a open system process in which a user registered at a franchised mall purchases products offered at another franchised mall.

A parent vendor that oversees a plurality of member vendor web sites under a franchise agreement may want customers registered at one of the franchised Web Sites to be able to purchase products or services offered at other franchised Web Sites. The parent vendor may have a program that allows a user registered at one of the franchised web sites to purchase products and services offered by other franchised web sites. These franchised web sites could then clear accounts between themselves at a pre-determined frequency through the MSP. Thus, the user is not required to register at other vendor web sites in the franchise. In FIG. 16, Mall A1 1601, Mall A2 1602, Mall A3 1603 and Mall An 1604 are members of the franchise, while Mall B 1502 is not.

A diagram showing steps for illustrative business transactions involving electronic tokens used in a franchise mall system is shown in FIG. 16. Business transactions involving other steps are also possible. FIG. 16 depicts a vendor, who has several franchised vendors, each of which is a token vendor. Each of the solid arrows indicates steps (1)-(14), which are a transaction in the direction of the arrow. user 1 1701 is a customer who registers at sub-mall Mall-A1 1601 and purchases tokens A1. User 1 may purchase or rent a product (or service) offered at Mall-A1 1601 using Token-A1.

User 2 1702 is a customer who registers at Mall-A2 1602 and purchases Tokens-A2. User 2 may ask Mall A2 to exchange a certain amount of his Tokens-A2 for Tokens-A3 from Mall-A3 1603 in order to purchase items sold on the Mall-A3 web site. Mall-A3 then grants an equivalent amount of Token-A3. User 2 then purchases or rents products (or services) offered at Mall-A3. This is shown in Steps (7), (8), (9), and (10) for transferring tokens and Steps (11) and (12) for purchasing products. Steps (13) and (14) indicate that Mall-A2 pays Mall-A3 as compensation for exchanging user 2's Tokens-A2 for Tokens-A3. Users 1701 and 1702 may be individuals or businesses including other vendors. Therefore, the open token systems of the present invention enable business-to-business transactions (B2B) and business-to-consumer (B2C) transactions. MSP 1500 provides for the exchange of tokens and settlement services among vendor malls 1602-1603.

As shown in FIG. 16, the sub-malls (Mall-A1 1601, Mall-A2 1602, Mall-A3 1603, Mall An 1604, and all other sub-malls) are franchise web sites of parent Mall-A 1501. Parent mall A 1501 may set the value of the tokens used by each sub-mall to be the same. A computer program at Mall-A 1501 or at MSP 1500 tracks user shopping activities among Mall-A's sub-malls, monitors financial data, and settles token and money accounts between sub-malls. Some of these services are the same services provided by the MSP in the closed system. With respect to FIG. 16, MSP 1500 keeps an additional record of the different values of tokens set by each individual Member Mall operator 1501-1503.

A vendor may set any price level for its electronic tokens. Accordingly, it may be desirable, as shown in FIG. 17, that the vendor display the cost of products or services at his Web site, both in terms of tokens, as well as, in actual case equivalent value. This may help the user to associate the cost more easily. Alternatively, the system may just display only the products purchased along with the number of required tokens. Furthermore, the present invention provides the user with a choice to pay for products or services, using tokens or a credit card. Until such time that the user becomes more comfortable purchasing tokens, the vendor may determine that providing a choice between credit card and tokens is no longer necessary as its users become more familiar with the use of tokens and appreciate the benefits of using tokens instead of credit cards. The vendor has the total control of the distribution of the tokens and can set the value of the tokens completely free from control by a bank or other organization to issue the tokens. The user purchases tokens directly from the vendor, in any way he chooses, either using on-line or off-line methods, without the need to involve a bank.

An open system of the present invention connects all member vendor web sites allowing transactions between member vendor malls through an MSP. The present invention also includes Open Tokens which are accepted by each member vendor mall as means for payments by users, who are registered at one of the member vendor malls. Open Tokens may be obtained from one member vendor and used for the payment of product(s) and services offered at other member vendor malls. Open Tokens are accepted by all member vendors and need not be exchanged for a different type of tokens, as with the embodiment of FIG. 13. Open Tokens attract new customers and facilitate the purchasing process.

There are four types of Open Tokens:

(1) Universal Tokens.

Universal tokens are accepted by each of the member vendor malls for payment when a user purchases or rents product(s) and services from any one of the member vendor malls. Thus, with Universal tokens, a customer does not need to exchange a first type of token issued by a first vendor for a second type of token issued by a second vendor to purchase items at the second vendor's web site. For simplicity, a Universal Token has one value for all member vendor malls and its value is set to be the same, similar to currency. For example, there may be a one dollar ($1.00) universal token and a one penny ($0.01) universal token.

The universal electronic tokens may be used for micropayments. An example of a micropayment includes music content which may cost less than one dollar ($1.00) per unit. Records of all Closed Tokens and Open Tokens are maintained (e.g., at databases associated with the MSP) to such precision as a fraction of a penny. This provides convenience to vendors since service charges or royalties on micropayments may very well involve fractions of a penny.

(2) Manufacturer's Tokens.

Manufacturer's tokens are issued by a manufacturer to promote sales of its products. If desired, a manufacturer may sell this type of token at a substantial discount or provide users incentives to purchase Manufacturer's Tokens. The Manufacturer's Token are accepted for conducting electronic transactions by the manufacturer's own Closed System web site and by other member vendor web sites in an Open System who carry and sell the manufacturer's products. Two examples of Manufacturer's Tokens are now discussed:

Manufacturer Type 1 Token.

This is a manufacturer's token sold at a certain discount and it is usable to purchase only manufacturer's products.

Manfacturer Type 2 Token.

This is a manufacturer's token that is issued for free to users an incentive. This type of token must be used in conjunction with Universal Tokens to purchase only manufacturer's products being offered for sale at the manufacturer's own web site or at other member vendor malls. Manufacturer's TYPE 2 tokens provide a pre-determined allowable maximum discount level for purchase of the manufacturer's product. Therefore, a user uses Universal Tokens to pay for manufacturer's product up to the allowable maximum discount and the same user pays for the discounted amount with the manufacturer's TYPE 2 tokens. Manufacturers provide compensation to vendors who accept the manufacturer's tokens from customers who use them to purchase the manufacturer's products.

The manufacturer's dealers sell manufacturer's products as close as possible to the published list price to maximize their sales opportunities and profit margins. These sales opportunities and profit margins would decrease if the manufacturer sells the same products at less than the published list price that is displayed openly at its own web site. Customers may use manufacturer's Type 1 Tokens to purchase the manufacturer's products from the manufacturer's dealers web sites. Customers may also use manufacturer's Type 2 Tokens and Universal Tokens to purchase the manufacturer's products from the dealers' web sites at the same discounted price offered by the manufacturer. The manufacturer's tokens allow a manufacturer to sell its products directly or indirectly (through its dealers) to end users at a discount and at the same time to avoid potential conflicts with the manufacturer's dealers. Thus, the manufacturer's tokens permit the establishment of discount programs while not undercutting the integrity of published list prices. Manufacturer's TYPE 2 tokens provide an incentive for users registered at member vendor malls to obtain manufacturer's TYPE 2 tokens for free, and to purchase the manufacturer's products with the user's Universal Tokens and manufacturer's TYPE 2 tokens at the member vendor malls.

(3) Group Tokens.

This type of token is issued and accepted by all member vendor malls that join as strategic marketing partners and form a "Group." As a member of the Group, the member vendor is permitted to sell to its users the Group Token at a pre-agreed discount. The Group Tokens may be issued by each of the member vendor in the Group. Group tokens provide customers with the incentive to purchase items sold by member vendors within the group, because customers can easily purchase items from any member vendor using group tokens issued by one of the member vendors.

(4) Gift Certificate Tokens.

This is a token similar to a gift certificate which has a pre-set cash value. The vendor accepting the Gift Certificate Token honors the full amount of the value for the user. A user using a Gift Certificate Token may get cash change if the amount the user is spending at the vendor web site is less than the value of the Gift Certificate Token. The Gift Certificate Token may be issued by a credit institution or a vendor, which usually obtains a commission from the vendor who accepts the gift certificate. The vendor or other vendors may accept the Gift Certificate Token for customers to purchase items, because the vendor hopes to attract more customers to use its facility (such as a hotel or a restaurant) or to sell more of its products to customers using such tokens.

Figure 18:
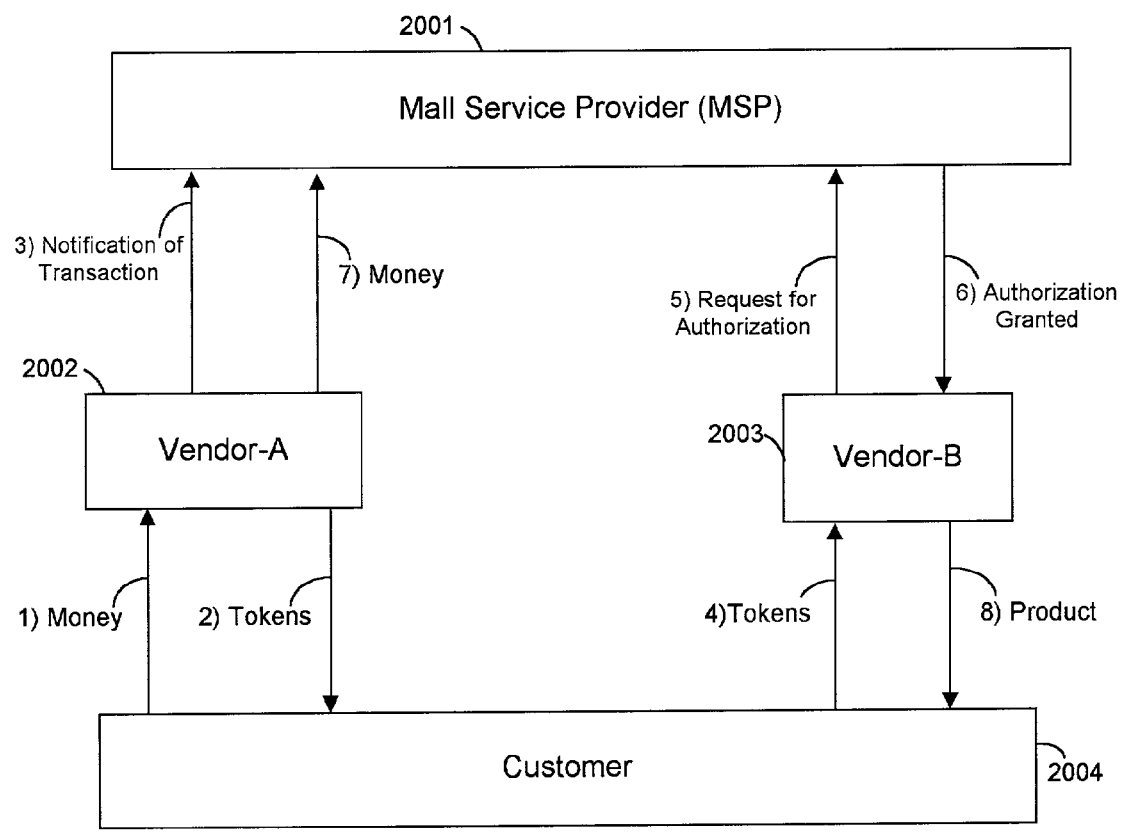
FIG. 18 is a description of a business transaction that takes place in an Open System in accordance with the principles of the present invention.
Figure 19:
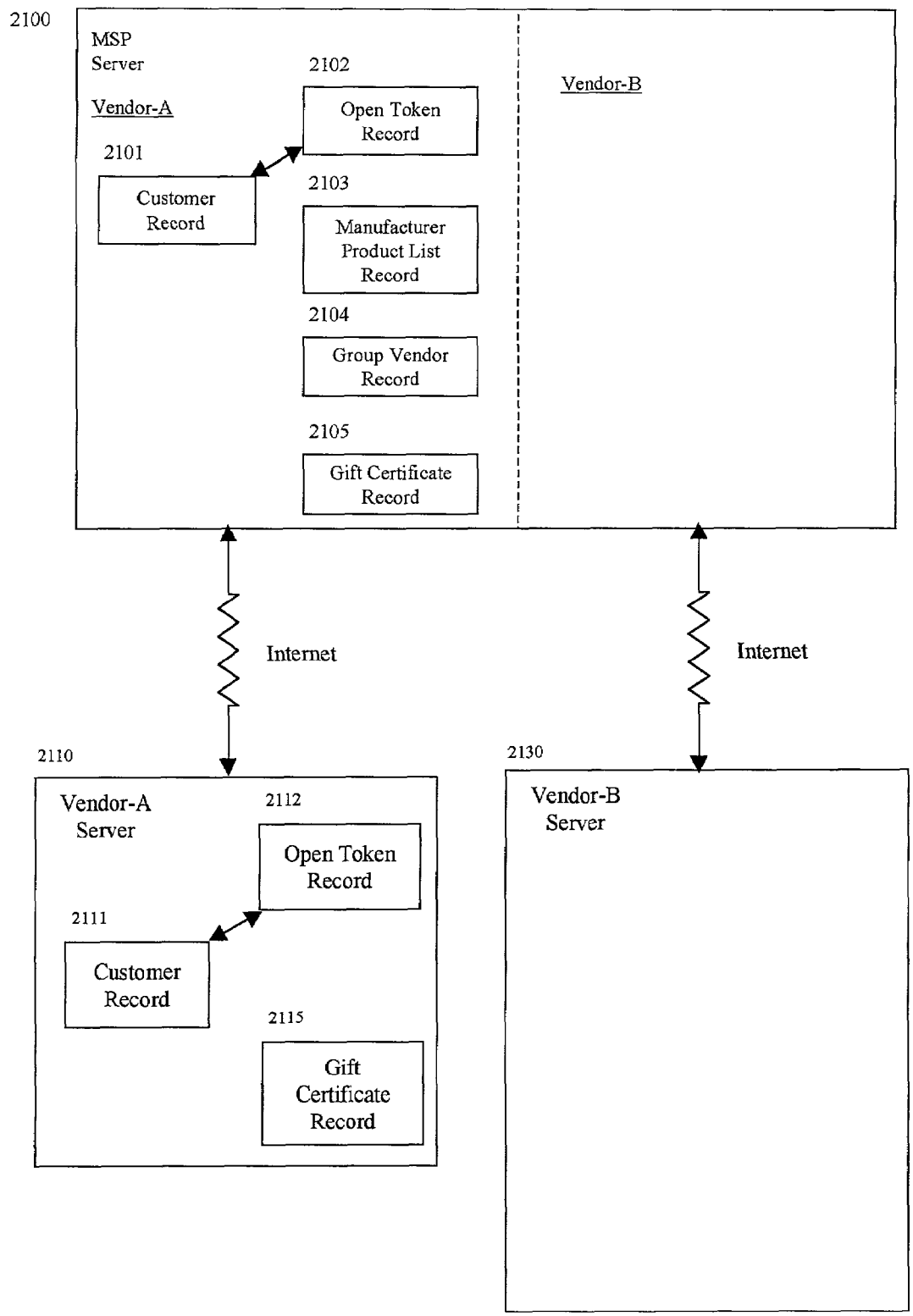
FIG. 19 is a more detailed diagram of databases that reside within the MSP server and the vendor servers in an open system in accordance with the principles of the present invention.

FIG. 18 is a diagram of an illustrative business transaction taking place in a Open System with open tokens. Other steps for similar business transactions using open tokens are also possible. The open tokens exchanged in an open system such as illustrated and discussed with respect to FIG. 18 may include any of the four types of open tokens previously discussed. In FIG. 19, MSP has server 2100 records 2101, 2102, and 2105 relating to customers of and open tokens authorized to Vendor A. Customer record 2101 contains the customers' personal information, open token record 2102 maintains the customers' account balances of open tokens, and gift certificate token record 2135 maintains the customers' account balances of gift certificate tokens. Server 2100 also has a set of records relating to customers of and open tokens authorized to Vendor B (not shown) and other vendors. If desired, customer record 2111, Open Token Record 2112, and gift certificate record 2115 may be maintained within Vendor-A server 2110 as shown in FIG. 19. Records 2111, 2112, and 2115 may contain the same information as stored in records 2101, 2102, and 2105. However, vendor A server 2110 does not need to maintain separate records that duplicate the records maintained at MSP 2100.

In FIG. 18 step (1), customer 2004 registered at Vendor-A 2002, requests to purchase open Tokens and pays for them, either on-line or off-line. In step (2), Vendor-A 2002 grants customer 2004 a certain number of requested open Tokens and it notifies MSP 2001 as shown in step (3). Open Token records 2101 and 2112 contain account information for customer 2004 such as the number of open tokens currently in the customer's account. When a business transaction involving tokens happens, a signal is sent to MSP server 2100 directing it to update Open Token Record 2102. Open token record 2112 may also be updated. In FIG. 18, customer 2004 decides to purchase products offered by Vendor-B 2003 using open tokens as shown in step (4). Vendor-B 2003 sends a request for authorization and requests payment from Vendor-A 2002 through MSP 2001, as shown in step (5). The MSP then checks the Open Token Record 2102 in MSP server 2100 to confirm that customer 2004 has enough Open Tokens to make the purchase (i.e., required tokens greater than actual tokens in account). MSP 2100 then authorizes Vendor-B 2003 to proceed with the business transaction in step (6). If enough tokens are present in the customer account, MSP server 2100 subtracts the required number of Open Tokens (RT) from customer 2004's account and updates both the Open Token Record 2102 and Open Token Record 2112 inside Vendor-A server 2110, in step (7) of FIG. 18. Alternatively, the above step (7) may be performed before step (6).

For purposes of illustration only, the currency shall be the U.S. dollar. MSP 2100 may then debit Vendor-A 2110 the total dollar amount of customer's 2004 purchase, less a service charge as shown in step (7) in FIG. 18. MSP 2100 may subtract the royalty from the total dollar amount and remit the remaining dollar amount (which is now the total cost of the purchase amount less a service charge for Vendor-A 2002 and less a royalty payment to MSP 2001) to Vendor-B 2003. In FIG. 18, Vendor-B 2003 delivers product(s) and/or service(s) to customer 2004 as shown in step (8). Note that steps (5), (6) and (7) occur transparently to customer 2004. Therefore, open tokens allow customers to purchase or rent product(s) and/or service(s) from any other member vendor mall. This provides the convenience to customers of not requiring them to register at each and every other member vendor mall.

Referring to FIG. 18, MSP 2100 checks to see if product(s) customer 2004 is purchasing is a manufacturer's product(s) on manufacturer's product list in record 2103 kept at the MSP 2100 server. Alternatively, Vendor-B 2003 may check to see if product(s) customer 2004 is purchasing is on a manufacturer's product list by checking a manufacturer's product list record inside Vendor-B server 2130. If the product is on the manufacturer's product list, MSP server 2100 checks open token record 2102 for customer 2004 to see if customer 2004 has manufacturer's tokens. If customer 2004 has enough manufacturer's tokens, payment of product(s) is performed through MSP 2100 using customer's 2004 Manufacturer's Tokens. Steps (6) and (7) take place identical to the case when customer 2004 uses Universal Tokens as described above. Again, steps (6) and (7) are transparent to customer 2004.

FIG. 18 also applies to group tokens. In this case, vendor-A 2002 and Vendor-B 2003 are members of a Group. Customer 2004 wishes to purchase product(s) and/or service(s) from Vendor-B 2003, as shown in step (4). MSP accesses Group Vendor Record 2104 inside MSP server 2100. Record 2104 indicates whether Vendor-A 2002 is a member of a Group. MSP server 2100 then checks open token record 2102 to see if customer 2004 has Group Tokens. If customer 2004 has Group Tokens, then the business transaction takes place exactly the same way as previously described, except the customer's Group Tokens required for his purchase (RT) are subtracted from his account, instead of other type of tokens (e.g., universal or Manufacturer's Tokens).

In another embodiment of the present invention, a customer may purchase a Gift Certificate Token from an issuing vendor or from a credit institution (e.g., credit card company or bank) and use it at member vendor malls who accept the Gift Certificate Tokens. In FIG. 18, customer 2004 purchases a Gift Certificate Token from Vendor-A 2002, in step (1). The gift certificate token may have any dollar value. Vendor-A 2002 issues the Gift Certificate token to customer 2004, in step (2). In FIG. 19, MSP server 2100 updates its customer record 2101 (or open token record 2102) to indicate that customer 2004 has purchased a gift certificate token. Server 2100 also updates its Gift Certificate Record 2105 to indicate the value of the gift certificate tokens purchased by customer 2004. Corresponding records at server 2110 such as gift certificate record 2115, customer record 2111, and open token record 2112 may also be updated.

Customer 2004 may now purchase items through Vendor B 2003 using the gift certificate tokens. When customer 2004 tries to purchase an item from Vendor B 2003 at step (4), Vendor B requests authorization through MSP 2001 at step (5). MSP 2100 then checks records 2102 or 2105 to see if the customer has a gift certificate token. If MSP server 2100 finds that customer 2004 does have a Gift Certificate Token, it debits Vendor-A 2002's account by the dollar amount equal to the value of the Gift Certificate Tokens held by customer 2004 less the discounted amount (or service charge) at step (7).

MSP 2001 then subtracts the royalty amount from this amount, authorizes the transaction at step (6), and pays Vendor-B 2003. Vendor-B then applies the full amount of the Gift Certificate Tokens to product(s) and/or service(s) sold to customer 2004 at step (8). Vendor-B 2003 also gives change (the surplus amount of the gift certificate remaining after subtracting the price of the product(s) and/or service(s) from the full value of the gift certificate containing the gift certificate tokens) back to customer 2004, if any. If the customer purchases a product using gift certificates on-line, any remaining amount is converted to Universal Tokens and put in the customer's account. MSP server 2100 then updates its customer record 2101 and Gift Certificate Record 2105 to remove the Gift Certificate Tokens from customer 2004's account. It also notifies the Vendor-A server 2110 to update its customer record 2111 and Gift Certificate Record 2115, as shown in FIG. 19, to reflect the fact that customer 2004 has used the gift certificate token.

Figure 20A:
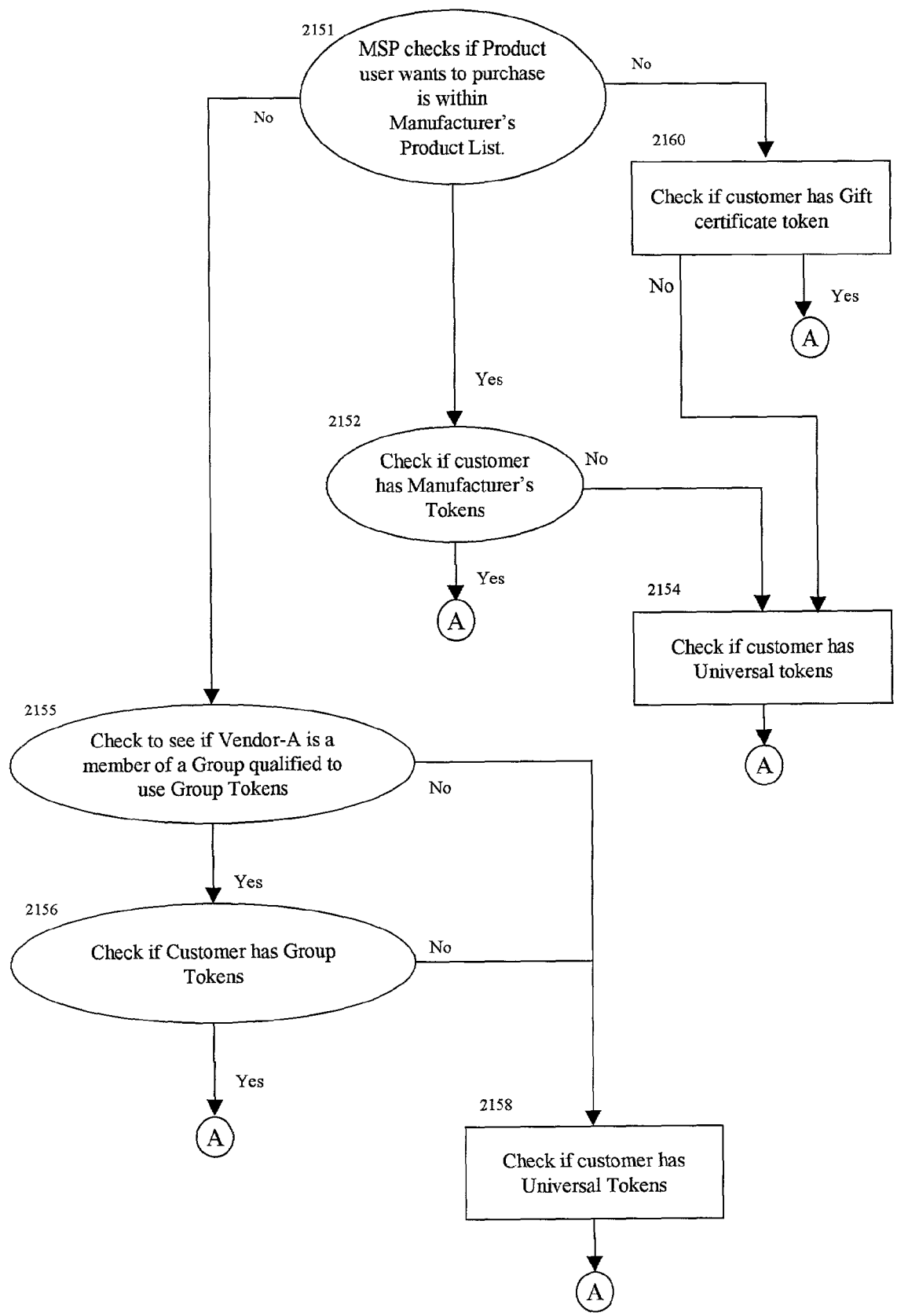
FIG. 20A is a flow chart showing a method to identify what kind of tokens a user shall use to interface with the MSP server and to display messages to a user in accordance with the principles of the present invention.
Figure 20B:
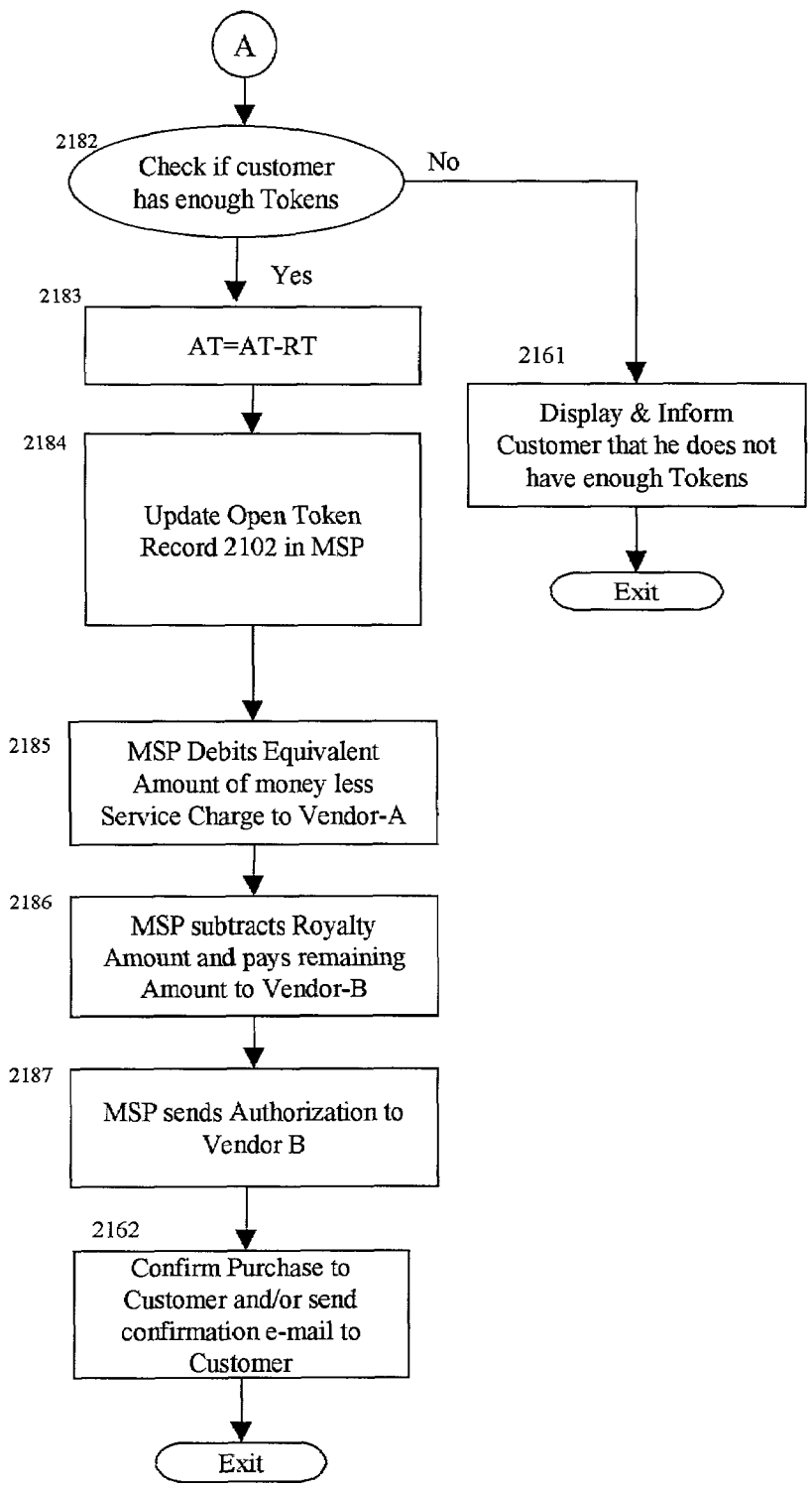
FIG. 20B is a continuation of the flow chart of FIG. 20A in accordance with the principles of the present invention.

FIGS. 20A-20B describe an example of a flow of actions that may take place within Vendor-B server 2130 and MSP server 2100 when a business transaction is initiated by a customer 2004 involving open tokens of the present invention. Alternatively, different or additional steps may take place within vendor servers and MSP servers of the present invention during a business transaction relating to electronic open tokens.

Referring to FIG. 20A, when a customer requests to pay for product(s) or service(s) provided by Vendor-B 2003, MSP server 2100 at step 2151 checks to determine if any product customer 2004 is purchasing is within the manufacturer's product list by accessing the manufacturer's product list which is maintained in record 2103 within MSP server 2100 shown in FIG. 19. If the product is on the manufacturer's product list, MSP server 2100 checks open token record 2102 to determine whether customer 2004 has Manufacturer's Tokens, in step 2152. If the customer has manufacturer's tokens, then the MSP server 2100 checks if the customer has enough manufacturer's tokens to make the purchase at step 2182. Customer 2004 registered and purchased Open Tokens from Vendor-A 2002 as shown in step (1) and step (2) of FIG. 18. If customer 2004 does not have Manufacturer's Tokens, then MSP 2100 checks record 2102 to see if the customer has Universal tokens at step 2154. If the customer does have universal tokens, then MSP server 2100 checks if the customer has enough Universal tokens to make the purchase at step 2182.

If the product(s) and/or service(s) that the customer is purchasing are not within the manufacturer's product list, MSP server 2100 automatically checks to determine if Vendor-A, where customer 2004 initially registered, is a member of a Group at step 2155. Group vendor record 2104 at MSP server 2100 maintains a listing of vendors within Groups controlled by MSP 2001. MSP server 2100 checks Group Vendor Record 2104 to determine if Vendor A is a member of a Group. If Vendor A is a member of a Group, MSP server 2100 checks open token record 2102 to see if the customer has Group Tokens, at step 2156. If the customer does have Group Tokens in his account, then MSP server 2100 checks if the customer has enough Group tokens to make the purchase at step 2182. If customer 2004 currently does not have group tokens in his account or if Vendor-A is not a member of a Group, then MSP 2100 checks record 2102 to see if the customer has Universal tokens at step 2158. If the customer does have Universal Tokens, MSP server 2100 checks if the customer has enough Universal tokens to make the purchase at step 2182.

If the product(s) customer 2004 wants to purchase are not on the manufacturer's product list, MSP server 2100 may check to see if the customer has any gift certificate tokens by checking gift certificate record 2105 (or records 2101/2102) in step 2160. Gift certificate records 2115 and 2105 contain data indicating the value of gift certificate tokens held by customer 2004. MSP server 2100 checks record 2105 (or accesses Record 2115 of Vendor-A) and determines if customer 2004 has Gift Certificate Token(s). If the customer does have a gift certificate token, then MSP server 2100 checks if the value of the gift certificate token is enough to make the requested purchase at step 2182. If the customer does not have a gift certificate token, MSP 2100 checks record 2102 to see if the customer has universal tokens at step 2154.

If the customer has universal tokens, manufacturer's tokens, gift certificate tokens, or group tokens, MSP server 2100 checks the corresponding open token record 2102 at step 2182 to see if the customer has enough open tokens (of one individual type or combined) to make the purchase. If the customer has enough Open Tokens, server 2100 then subtracts the number of Open Tokens that are required for the customer to make the purchase (RT) from customer's Available Tokens (AT) at step 2183. Server 2100 then updates Open Token Record 2102 (and Vendor-A server record 2112) in step 2184. MSP server 2100 also updates its gift certificate records 2105 and 2115 for customer 2004 to reflect the current value of any gift certificate tokens he has in his account.

MSP 2100 then debits the dollar equivalent of RT less service charges imposed by Vendor-A at step 2185. The service charges may be previously agreed upon among all member vendor malls. The payment by Vendor-A may be done immediately through electronic funds transfer or subtracted from Vendor-A's deposit to MSP or invoiced later, if such prior payment arrangement is done in advance. In step 2186, MSP 2100 subtracts the royalty amount due for the business transaction and pays Vendor B. MSP 2100 then authorizes Vendor-B to proceed and complete the business transaction, at step 2187.

If customer 2004 does not have enough Open Tokens to pay for his purchase of product(s) and/or service(s) as determined by MSP server 2100 at step 2182, server 2100 informs customer 2004 that he does not have enough Open Tokens, as shown in step 2161. The customer can then decide if he wants to purchase more Open Tokens on-line now, or off-line later.

If desired, MSP server 2100 may combine two or more different categories of tokens (such as Group Tokens and Gift Certificate Tokens) to obtain enough dollar value to equal or exceed the purchase price of the product or service so that the transaction may be completed. This option may be utilized if the customer does not have a large enough value of any one type of token to make the requested purchase, but does have enough value when tokens of different types are combined.

Vendor-B server 2130 or MSP server 2100 then informs customer 2004 and confirms his purchase or rental of product(s) and/or service(s) as shown in step 2162. This may be done by updating the web page to indicate that the transaction is complete. If desired, MSP server 2100 may send an e-mail message to the customer confirming the purchase order. The e-mail message may indicate what user account is being debited to make the purchase, what type of electronic tokens were removed from the user account, (e.g., Group tokens, Universal tokens, manufacturer's tokens, gift certificate tokens), and the amount of tokens remaining in the user account. The customer may change the type of tokens used as payment for the purchase (e.g., from Universal tokens to Gift certificate tokens) by replying to the confirmation e-mail and indicating in the reply message which tokens should be used for the electronic transaction.

In the Open token system described in FIG. 18, FIG. 19, FIG. 20A, and FIG. 20B the MSP server acts as a highway link for all member vendor malls. If desired, the MSP may impose a nominal service charge to all member vendor malls for allowing the passage of information through the MSP, like a highway toll booth.

The MSP in an open token system monitors transfer of tokens among member vendors. For example, the MSP can prevent transfer of tokens issued from a vendor whose performance does not meet the standards of business practice established by the MSP to participate in the token transfer program. An MSP also can prevent a member vendor from continuing to use the MSP's electronic tokens, thereby preserving the integrity of its token system. Furthermore, the MSP also tracks tokens that have been paid for, tokens issued to preferred customers in advance of payment, and free tokens issued as part of a vendor's incentive program. This may be desirable because the vendor may decide to issue free tokens to a user who has already purchased tokens in his account but has not used them recently. This gives the user the perception that he is receiving an interest payment, like depositing money in a bank.

The MSP tracks free tokens issued to a user. Because free tokens may be provided to a user to promote customer loyalty, it is desirable that a user be prevented from transferring these free tokens to other vendor web sites. The MSP may prevent the transfer of free tokens to other vendor malls. The MSP also tracks other Closed Tokens issued by a vendor, which are intended to provide an incentive to its users to purchase products and services from the issuing vendor.

The MSP may perform the following tasks:

(1) Keeps track of the value of tokens as set by each Vendor Web Site.

(2) Keeps track of each vendor who accepts other vendors' tokens for purchase of products or services in a Group system.

(3) Sends the user's information to another vendor, allowing the other vendor to have the user information to conduct business transactions.

(4) Transfers one vendor's open tokens to other vendors, allowing a user of one vendor's Web Site to purchase products or services offered by other vendor's Web Sites.

(5) Keeps track of participating vendors who issue Manufacturer's Tokens and of product lists that each manufacturer's token can be used to purchase.

(6) When a user of a Web Site A transfers his tokens to Web Site B through the MSP, the MSP computes the value of tokens transferred from Web Site A to Web Site B so that Web Site A can pay Web Site B for the value of tokens so transferred.

(7) Keeps track of a list of participating vendors who accept Gift Certificate tokens issued by other vendors.

(8) Keeps track of names of a group of vendors who accept Group Tokens so as to prevent transferring of Group Tokens of vendors who do not belong to the group.

(9) The MSP serves to clear accounts promptly between a vendor where a user is registered and the other vendors from which the user transfers his Open Tokens. Alternatively, the account may be reconciled at a later time, such as at the end of each month or at other regular intervals as mutually agreed upon.

(10) Prevents a vendor from further using the tokens for business transaction, if the vendor does not maintain a predetermined quality standard or if the vendor otherwise does not comply with contractual obligations set by the MSP.

The present invention offers many advantages to end users and vendors. These advantages for end users include:

Micropayments for users are facilitated;

The user's personal information remains secure;

Users' account information is stored within the MSP server or alternatively at the vendor server database. Thus, users can purchase products and services offered by other member vendors without having to register at each new subscriber mall, because users' account information is accessible through the MSP;

Users can purchase tokens either on-line or off-line;

Users may take advantage of on-line incentives, quantity discounts, and manufacturer's coupons of a vendor Closed System;

Vendors can allow users to purchase tokens on credit instead of paying for them in advance;

The method and system would allow parents to limit their children's purchases to a limited network of vendors who share closed tokens.

Advantages for vendors include:

Vendors have substantial control over the terms of the purchase;

Vendors can offer many different types of incentive programs by issuing tokens to users for a discount or for free;

With the Open System, vendors can increase their revenues if its registered users purchase items from other member vendors. Vendors may enter into reciprocal marketing programs with other member vendors to encourage users to buy products from all member vendor web sites, thereby increasing revenue for all member vendors. Thus, the open system provides a system for increasing web traffic at vendor web sites and to attract large numbers of users;

Vendors can issue Closed Tokens at any price.

As a result of the above-described advantages for end users and vendors, the method and system of the present invention allows:

(1) Each Closed System vendor to compete for users;

(2) The Open System provides convenience to users in that they need to only be registered with any one of the member vendors. The open system also attracts more vendors to join as member vendors, because they can attract customers of the other member vendors to their web site;

(3) Electronic tokens can be used for micropayments as small as a penny and it can keep account for service charges and royalties as small as a fraction of a penny. An analogy can be made to turning on the lights. Users do not concern themselves with a charge each and every time they turn on the lights. If amortized using the electrical rate and the usage when the lights are turned on, the amount would be measured in fractions of a penny. The user only pays for such usage at the end of the month when the monthly invoice is received.

Figure 21:
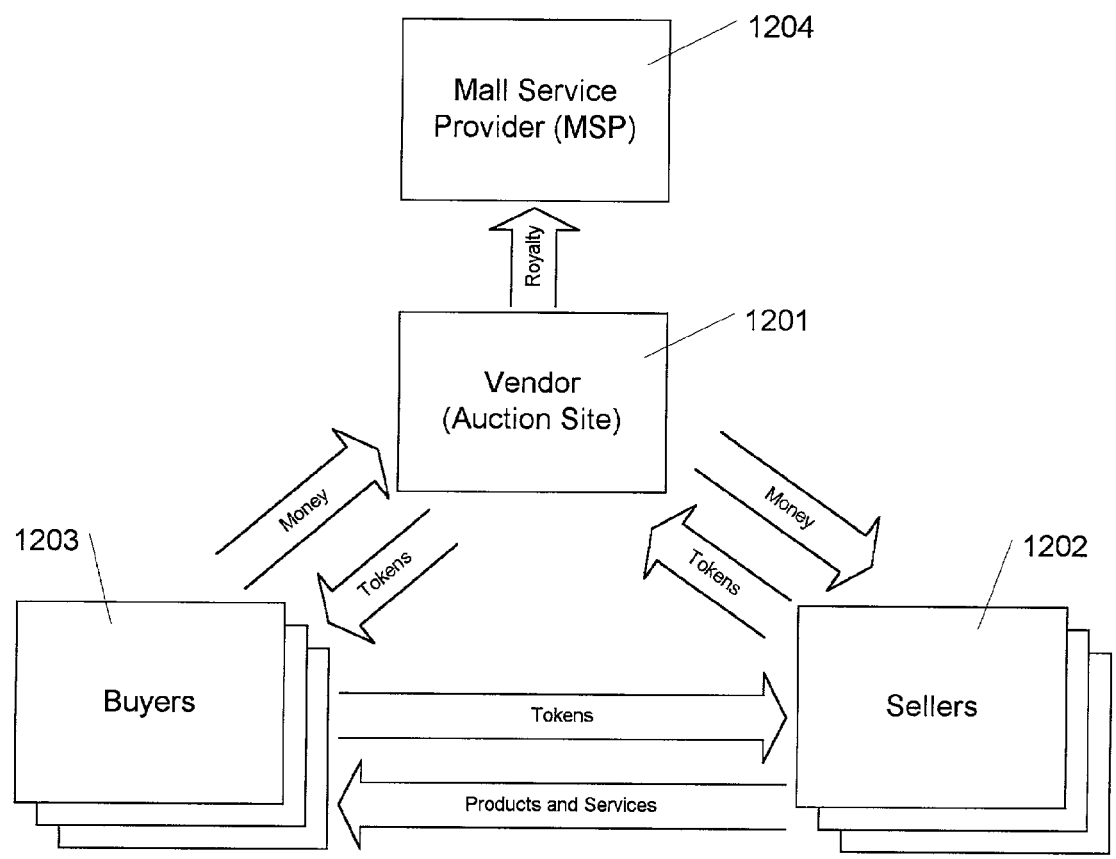
FIG. 21 shows an embodiment of the present invention for use on an auction site, in which electronic tokens are used for payment.

Referring to FIG. 21, an alternative embodiment of the electronic token system of the present invention for use on an auction site or other site that facilitates transactions between users of the site is shown. Mall Service Provider (MSP) 1204 authorizes vendor 1201 (i.e., an auction mall web site) to use electronic tokens in electronic transactions conducted through its web site. Vendor 1201, instead of directly selling products and services, as in previously described preferred embodiments, acts as an intermediary through which users can sell products and services to each other. Additionally, vendor 1201 buys and sells electronic tokens that may be used by the users to transact business. By using electronic tokens as payment between users for products and services, the users are able to quickly and easily pay each other for products and services, without having to obtain and send a money order, as is typically required by sellers on current auction sites.

Vendor 1201 provides both on-line and off-line sale of electronic tokens, as described in detail hereinabove. Additionally, vendor 1201 may permit electronic tokens to be redeemed for money, either on-line, through issuing a credit on a credit card, or off-line, by issuing and mailing a check for redeemed tokens.

Sellers 1202 are users of the Web site or other e-commerce venue offered by vendor 1201. Through vendor 1201, who may receive a commission, fee or other payment, sellers 1202 offer products and services for sale or auction, with prices or minimum bids listed in tokens.

Buyers 1203 use the Web site provided by vendor 1201 to purchase products and services from sellers using electronic tokens. Buyers 1203 may competitively bid upon products or services on sale or for rental by sellers. Buyers 1203 pay for products or services, or place bids for products and services using electronic tokens. Sellers 1202 may be paid for their products or services by transferring the appropriate number of electronic tokens between the accounts of buyers 1203 and sellers 1202.

Vendor 1201 may require that sellers 1202 and buyers 1203 set up user accounts with the vendor web site before conducting electronic transactions through the web site. Vendor 1201 may require buyers 1203 to purchase a minimum number of auction Tokens to be placed in an account. MSP 1204 may authorize electronic tokens to be used for electronic transactions at other vendors' web sites. Vendor 1201 may permit buyers 1203 to exchange the tokens that they received from these other vendors for auction tokens that are issued by vendor 1201. In any event, buyers 1203 must have enough Tokens from vendor 1201 for any purchases made through vendor 1201. The Tokens that buyers 1203 purchase from vendor 1201 or that are transferred from other vendors in exchange for auction tokens issued by vendor 1201 are placed in the buyer's account.

Sellers 1202 may use the electronic tokens that they gain from selling their products and services to purchase products and services from other sellers. Alternatively, sellers 1202 may sell their tokens back to vendor 1201 for money.

This system offers numerous advantages over current auction sites and other venues for conducting e-commerce between individuals. First, the individual buyers 1203 and sellers 1202 are able to easily arrange payment, rather than requiring that checks or money orders be sent. Additionally, there is no need for buyers 1203 and sellers 1202 in different countries to be concerned about currency exchange, since all transactions are handled in electronic tokens, which may be bought and sold by vendor 1201 for any form of currency that vendor 1201 chooses to accept. Further, vendor 1201 can make his "commission" on sales on the system by buying electronic tokens back from sellers 1202 at a different price than they are sold to buyers 1203, thereby simplifying the task of collecting payment from sellers 1202.

A portion of the commissions received from transactions between buyers 1203 and sellers 1202 is transferred to MSP 1204 as a royalty. Vendor 1201 may retain part of the royalty as compensation for its own services. Royalties received from the use of Tokens in multiple transactions vendor 1201 may be transferred to MSP 1204 in a lump sum.

It will be understood by one skilled in the art that the embodiment of the present invention described with reference to FIG. 21 may be used for more than just auctions between individual buyers and sellers. The buyers and sellers may be businesses or other corporations, and there is no need that the transactions be carried out in auction style.

Similar methods may be used in which sellers 1202 simply list their products and services with vendor 1201, with prices in electronic tokens, and buyers 1203 buy the products and services from sellers 1202 through vendor 1201, using electronic tokens as the exclusive means of payment. As discussed above, only electronic tokens issued by the vendor may be transferred or used on that vendor's site.

Another embodiment of the present method and system is an on-line point of sale (POS) system using electronic tokens. In a normal on-line system, a user selects product(s) and/or service(s) for purchase or rent at the vendor's web site. In an on-line token POS system, the product(s) and/or service(s) that a user purchases or rents are independent of the computer system. These product(s) and/or service(s) are entered manually into the Token POS terminal by a cashier at the vendor site.

Figure 22:
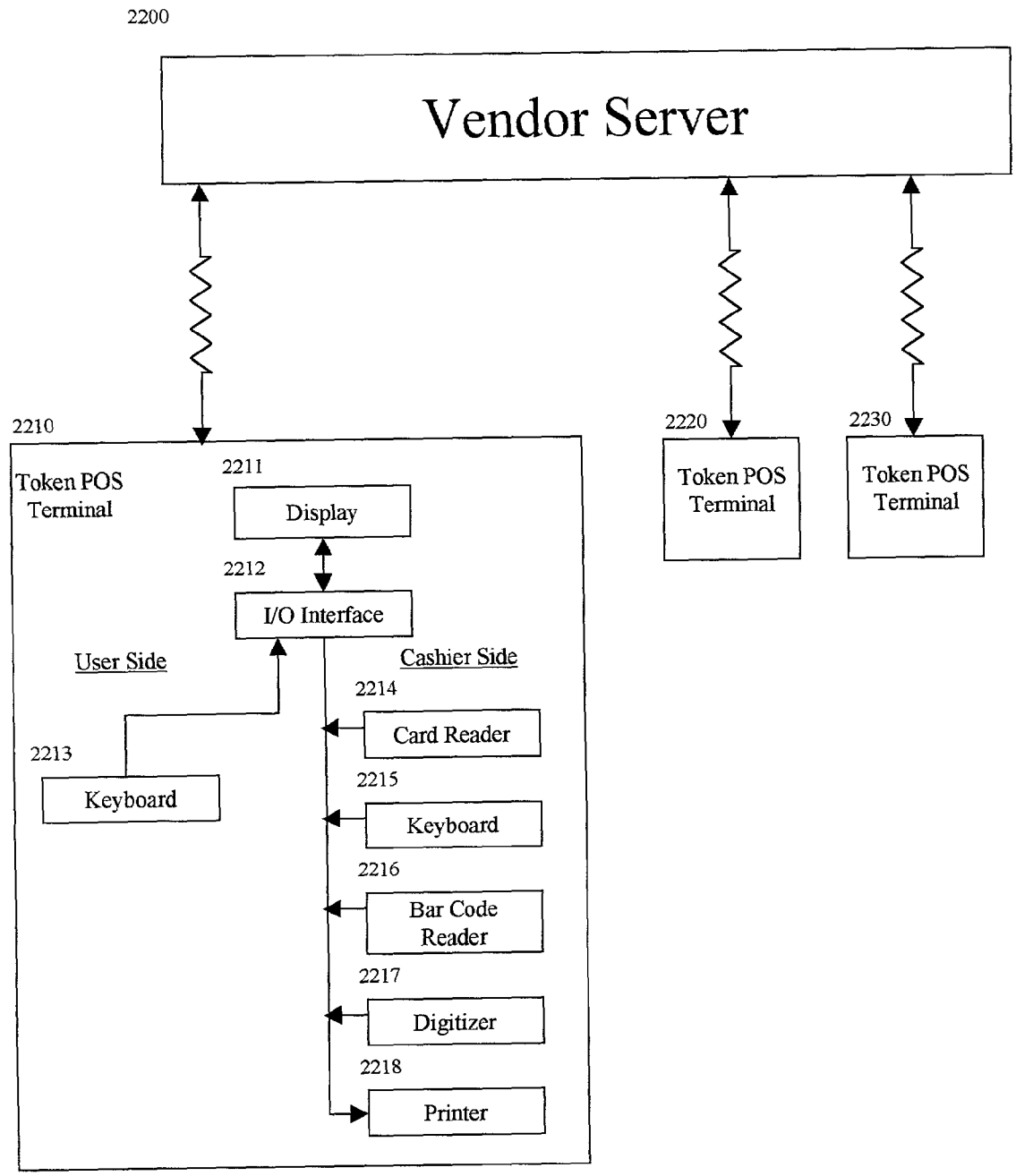
FIG. 22 is a block diagram describing components of a token point of sale system that are connected to a vendor server in a Closed System in accordance with the principles of the present invention.

An illustrative point of sale system is shown in FIG. 22. A vendor such as, but not limited to, a supermarket, hotel, restaurant, and school campus cafeteria, has vendor server 2200. A plurality of Token POS terminals 2210, 2220, 2230 are connected to vendor server 2200 at convenient places inside or outside a vendor site. When a customer comes to a cashier who operates a Token POS terminal, such as terminal 2210 for example, he presents to the cashier a user card. The cashier enters the user number using card reader 2214 attached to Token POS terminal 2210. If the user does not have his user card, he can enter his user number himself at the user side keyboard 2213 or ask the cashier to enter his user number at the cashier side keyboard 2215. The computer display 2211 immediately displays the user's name and address as well as the user's available tokens (AT). For security reasons, display 2211 may face the cashier side, so that it keeps personal information out of visual contact by other customers in the check-out line waiting to check out.

If desired, the cashier may input the user's name or address to confirm the identity of the user instead of the user number. Thus, the Token POS terminal 2210 eliminates the need to enter the user number. This provides convenience both to the user and to the cashier.

The cashier may then enter the cost of each product using bar code reader 2216, such as those that are used in supermarkets, or digitizer 2217, which has a menu list that is normally used at restaurants and fast food chains. The cashier may also manually enter the prices using keyboard 2215. When each item is entered by a cashier, the Token POS terminal may display the product or menu name and its cost in actual currency as well as in corresponding number of tokens. When all products or menu items are entered, the cashier enters TOTAL either at keyboard 2215 or digitizer 2217. Token POS terminal 2210 then displays the cost of the total purchase. The cashier may then turn the display to the user side for his confirmation. If desired, the system may allow the user press the CONFIRM or the ENTER button. Printer 2218 prints out the receipt which may contain the date, time, user's name, total number of tokens used, and the tokens remaining in the user's account (AT). If the vendor site operator prefers, the system may request the user to input his personal identification number (PIN) before the user presses the CONFIRM or ENTER key. This completes the business transaction.

Additionally, since it is a Closed system, the vendor may, at its own discretion, allow a "negative draw" if the user does not have enough tokens to pay for the product(s) and/or service(s). For example, a college may allow each student a certain maximum amount of negative draw or line of credit, rather than immediately reject his purchase for food.

The on-line point of sale system using electronic tokens is a Closed System, and it provides convenience to users and vendors without having to use actual currency and without having to link each and every transaction to a credit card company or banking institution. The process may increase the speed of the check-out time by instantaneously processing the business transaction and informing the vendor and customer exactly how many Available Tokens are left in the customer's account. Usually time is required for writing a check or waiting for the confirmation response from the credit card institution using the debit or credit card. It also provides the opportunity to allow institutions such as colleges to reduce the use of cash.

Figure 23:
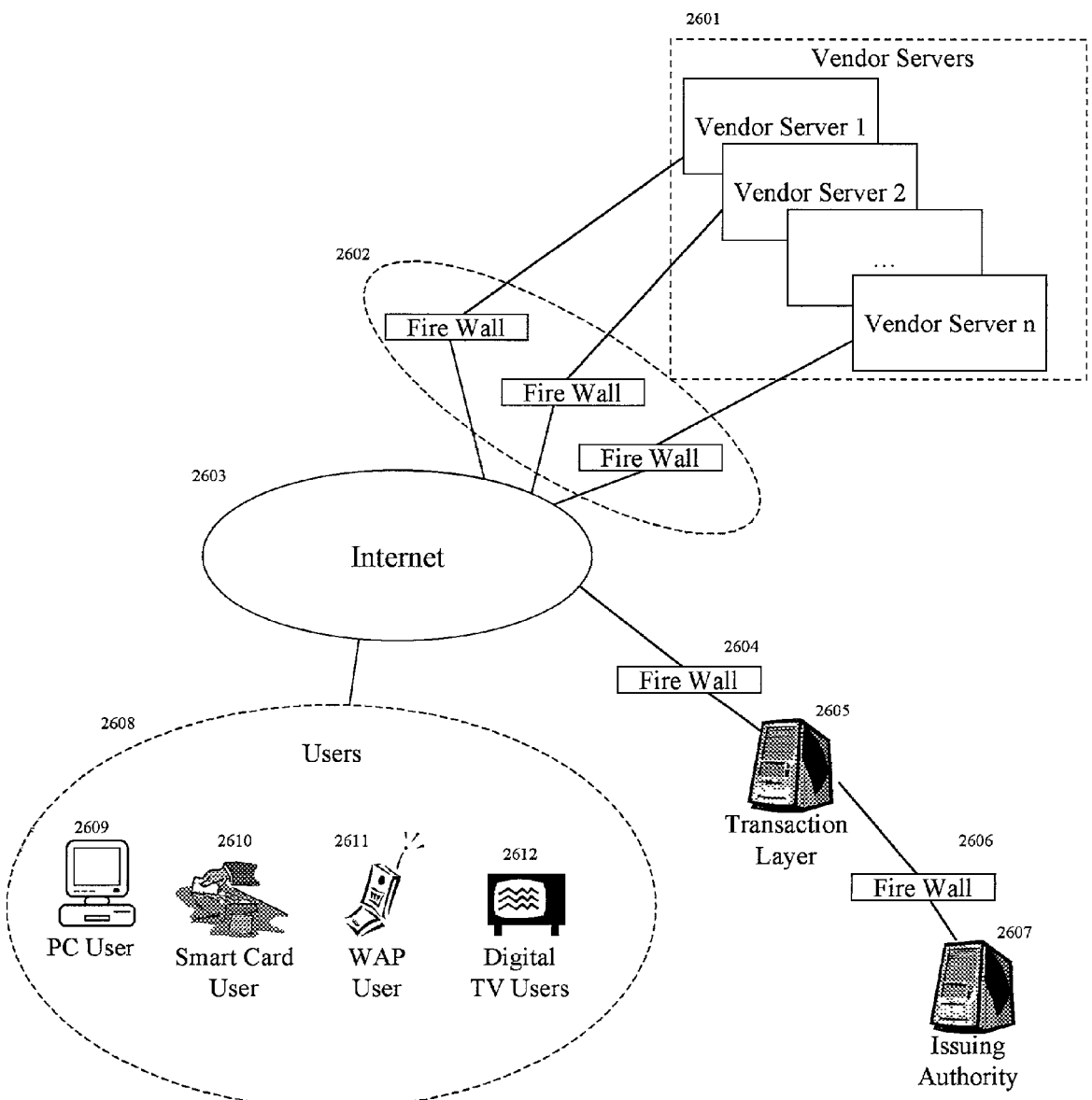
FIG. 23 is a diagram illustrating an illustrative communication network involving electronic tokens in accordance with the principles of the present invention.

The diagram shown in FIG. 23 illustrates an example of the architecture of the present invention. Multiple vendor web servers 2601 are connected through Internet 2603 to the MSP which includes issuing authority 2607 and transaction layer 2605. Transaction layer 2605 and issuing authority 2607 are protected by firewalls 2604, and 2606, respectively. Vendor servers 2601 are each protected from the Internet by a respective one of firewalls 2602. Transaction layer 2605 provides an interface to each vendor web page. Transaction layer 2605 interacts with the user via Internet 2603 when the user selects tokens as the method of payment for the purchase or rental of products and/or services at a vendor web site. Because transaction layer 2605 interacts directly with the user, the software required to interface between the MSP and the users at each vendor web site is minimized.

Transaction layer 2605 begins its interaction with the user by asking the user for his account number and/or personal ID number. Transaction layer 2605 then displays at the vendor web site the cost of the products and services the user wishes to purchase in number of tokens. The vendor web site may also display prices for the products/services in actual currency on its web page. Transaction layer 2605 then obtains the user's available tokens (AT) from the MSP issuing authority 2607 and displays on the web site the available tokens (AT) and the total number of tokens (RT) required for the user to make the purchase. After transaction layer 2605 receives an input from the user confirming the purchase, transaction layer 2605 subtracts RT from the user's AT. Transaction layer 2605 then updates customer record 1901 and closed token record 1902, in MSP server 1900 (FIG. 14) or customer record 2101 and open token record 2102 (FIG. 19). Gift certificate record 2105 in FIG. 19 is updated if the user uses a Gift certificate token.

The present invention allows users 2608 to use electronic tokens to conduct transactions through a variety of input devices such as a personal computer 2609, a smart card reader 2610, a wireless access protocol (WAP) device 2611, or digital television 2612, or other input devices not shown in FIG. 23.

While preferred illustrative embodiments of the present invention are described above, it will be evident to one skilled in the art that various changes and modifications may be made without departing from the invention.

What is claimed is:

1. A method of conducting electronic commerce, the method comprising:
   opening a user account with a first member vendor;
   issuing electronic tokens of a first type to a user, and adding the electronic tokens to a user account maintained by the first member vendor:
   exchanging the electronic tokens in the user account for electronic tokens of a second type, the electronic tokens of the second type being issued by a second member vendor;

purchasing or renting products or services through the second member vendor using the electronic tokens of the second type, wherein prices for the products or services are listed in units of electronic tokens of the second type; and transferring compensation from the first member vendor to the second member vendor in an amount equal to the value of the electronic tokens of the second type.

2. The method of claim 1, wherein issuing electronic tokens of the first type further comprises permitting the user to purchase the electronic tokens of the first type from the first member vendor.

3. The method of claim 2, wherein permitting the user to purchase the electronic tokens of the first type from the first member vendor further comprises permitting the user to conduct an online transaction using a credit card or other electronic payment system to purchase the electronic tokens.

4. The method of claim 2, wherein permitting the user to purchase the electronic tokens of the first type comprises permitting the user to conduct an off-line transaction to purchase the electronic tokens.

5. The method of claim 1 further comprising:
exchanging a subset of electronic tokens in the user account for a group of electronic tokens of a third type, the electronic tokens of the third type being issued by a third member vendor; and
purchasing or renting products or services through the third member vendor using the electronic tokens of the third type, wherein prices for the products or services are listed in units of electronic tokens of the third type.

6. The method of claim 1 further comprising:
notifying a mall service provider that electronic tokens have been issued to the user.

7. The method of claim 6 wherein the user account is maintained at the mall service provider.

8. The method of claim 1 wherein a service charge is deducted each time electronic tokens issued by the first member vendor are exchanged for tokens issued by the second member vendor.

9. The method of claim 1 further comprising:
notifying a mall service provider each time a user registers with a member vendor.

10. The method of claim 1 wherein purchasing or renting services or products further comprises:
competitively bidding on one or more of the products or services.

11. The method of claim 1 further comprising:
recording a royalty transaction for each electronic transaction conducted using the electronic tokens.

12. The method of claim 1 further comprising:
recording a toll charge when the second member vendor requests information relating to the customer from the first member vendor.

13. The method of claim 1 further comprising:
recording a toll charge when the first member vendor reimburses the second member vendor for electronic tokens.

* * * * *